(12) United States Patent
Cheng et al.

(10) Patent No.: US 8,979,197 B2
(45) Date of Patent: Mar. 17, 2015

(54) CHILD SEAT HAVING AN ANCHORING HARNESS

(71) Applicant: Wonderland Nurserygoods Company Limited, Central Hong Kong (HK)

(72) Inventors: Chin-Ming Cheng, Central Hong Kong (HK); Yu-Ya Su, Central Hong Kong (HK); Brad Thomas Bickley, Taipei (TW)

(73) Assignee: Wonderland Nurseygoods Company Limited, Hong Kong (HK)

( * ) Notice: Subject to any disclaimer, the term of this patent is extended or adjusted under 35 U.S.C. 154(b) by 0 days.

(21) Appl. No.: 13/654,602

(22) Filed: Oct. 18, 2012

(65) Prior Publication Data
US 2013/0106157 A1     May 2, 2013

Related U.S. Application Data

(60) Provisional application No. 61/548,736, filed on Oct. 19, 2011, provisional application No. 61/564,872, filed on Nov. 30, 2011, provisional application No. 61/580,250, filed on Dec. 26, 2011.

(51) Int. Cl.
*B60N 2/26* (2006.01)
*B60N 2/28* (2006.01)

(52) U.S. Cl.
CPC ............ *B60N 2/26* (2013.01); *B60N 2/2806* (2013.01); *B60N 2/2866* (2013.01); *B60N 2/2887* (2013.01)
USPC ..................................................... 297/253

(58) Field of Classification Search
CPC ....... B60N 2/28; B60N 2/2887; B60N 2/2806

USPC ............................................. 297/253, 250.1
See application file for complete search history.

(56) References Cited

U.S. PATENT DOCUMENTS

| 4,632,460 A | 12/1986 | Meeker et al. |
| 5,383,708 A | 1/1995 | Nagasaka et al. |

(Continued)

FOREIGN PATENT DOCUMENTS

| EP | 1078809 A1 | 2/2001 |
| EP | 2233348 A1 | 9/2010 |

(Continued)

OTHER PUBLICATIONS

Name of Author Unknown—from the World Auto publication, in a section entitled NCAP & SAFETY, an article entitled "Elaborate Guardianship" cited in the co-pending Chinese patent application.

*Primary Examiner* — Milton Nelson, Jr.
(74) *Attorney, Agent, or Firm* — David I. Roche; Baker & McKenzie LLP

(57) ABSTRACT

The present application describes child seats having anchoring harnesses that can attach with an external anchorage fixture, such as the anchorage fixture provided in a vehicle. In some embodiments, the child seat comprises a seat portion and an anchoring harness. The seat portion includes a rear edge, and a slot and a bar segment disposed adjacent to the rear edge, the bar being accessible from an outside of the seat portion and extending transversally. The anchoring harness is assembled with the seat portion and includes a fastener operable to attach with an external anchorage fixture for holding the child seat in place, wherein the anchoring harness is routed through the slot and wraps at least partially around the bar segment.

20 Claims, 20 Drawing Sheets

(56) References Cited

U.S. PATENT DOCUMENTS

| | | |
|---|---|---|
| 5,957,531 A | 9/1999 | Kane et al. |
| 6,193,310 B1 | 2/2001 | Batalaris et al. |
| 6,908,100 B2 | 6/2005 | Kassai et al. |
| 7,159,948 B1 | 1/2007 | Wolf |
| 7,347,494 B2 * | 3/2008 | Boyle et al. .................. 297/253 |
| 7,445,230 B2 | 11/2008 | Kassai et al. |
| 7,597,396 B2 | 10/2009 | Longenecker et al. |
| 8,056,975 B2 | 11/2011 | Longenecker et al. |
| 2002/0175545 A1 | 11/2002 | Cone |
| 2003/0030311 A1 | 2/2003 | Woodard et al. |
| 2003/0160485 A1 * | 8/2003 | Mullen et al. ................ 297/253 |
| 2007/0001495 A1 | 1/2007 | Boyle et al. |
| 2007/0052269 A1 | 3/2007 | Chen et al. |
| 2010/0244516 A1 * | 9/2010 | Fiore et al. ................. 297/250.1 |
| 2014/0132045 A1 | 5/2014 | Brady et al. |

FOREIGN PATENT DOCUMENTS

| | | |
|---|---|---|
| EP | 2394842 A2 | 12/2011 |
| FR | 2539287 A1 | 7/1984 |
| FR | 2559043 A1 | 8/1985 |
| GB | 1519793 A | 8/1978 |
| GB | 2454367 A | 6/2009 |
| WO | 2011094570 A2 | 8/2011 |

* cited by examiner

CHILD SEAT HAVING AN ANCHORING
HARNESS

CROSS-REFERENCE TO RELATED APPLICATIONS

This application claims priority to U.S. Provisional Patent Application No. 61/548,736 filed on Oct. 19, 2011; to U.S. Provisional Patent Application No. 61/564,872 filed on Nov. 30, 2011; and to U.S. Provisional Patent Application No. 61/580,250 filed on Dec. 26, 2011.

BACKGROUND

1. Field of the Invention

The present inventions relate to child seats provided with anchoring harnesses.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to hold the child safety seat in place, whereas the child safety seat has an internal child restraint harness more adapted to provide protection for the young child.

For a child of higher age, the size of the child safety seat may not be adapted to seat the child having a larger body. In this case, a booster seat may be used to increase the height at which the child sits, and the seatbelt of the vehicle can be used to properly restrain the child. Unlike the child safety seat, the booster seat is usually placed on the vehicle passenger's seat without attachment. When collision occurs, the booster seat may be subject to displacement, which may adversely affect the restraining protection provided by the seatbelt.

Accordingly, there is a need for a child seat that can be securely held in place when installed in a vehicle, and address at least the foregoing issues.

SUMMARY

The present application describes child seats having anchoring harnesses that can attach with an external anchorage fixture, such as the anchorage fixture provided in a vehicle. In some embodiments, the child seat comprises a seat portion and an anchoring harness. The seat portion has a lower surface, an upper surface for providing sitting support, and a rear edge defining a rear border of the lower and upper surfaces. The anchoring harness includes a fastener operable to attach with an external anchorage fixture for holding the child seat in place, wherein the anchoring harness is connected with the seat portion at a location adjacent to the rear edge.

In other embodiments, the child seat comprises a seat portion and an anchoring harness. The seat portion includes a lower surface, an upper surface for providing sitting support, a rear edge defining a rear border of the lower and upper surfaces, and a slot and a bar segment disposed adjacent to the rear edge, the bar being accessible from an outside of the seat portion and extending transversally, and the opening extending through the lower and upper surfaces. The anchoring harness is assembled with the seat portion and includes a fastener operable to attach with an external anchorage fixture for holding the child seat in place, wherein the anchoring harness is routed substantially vertically through the slot and wraps at least partially around the bar segment.

DETAILED DESCRIPTION OF THE EMBODIMENTS

The present application describes child seats having anchoring harnesses. Embodiments of the child seat include a seat portion and an anchoring harness. The seat portion has an upper surface and a rear edge, and an armrest protruding from the upper surface. The anchoring harness can be attached with the seat portion at a location near the rear edge of the seat portion and the armrest. The anchoring harness can include a strap that is attached with the seat portion at one end, and is provided with a fastener at an opposite distant end. When the child seat is placed on a vehicle passenger's seat, the fastener can attach with an anchorage fixture of the vehicle, whereby the anchoring harness can hold the child seat in place.

Figure 1A:
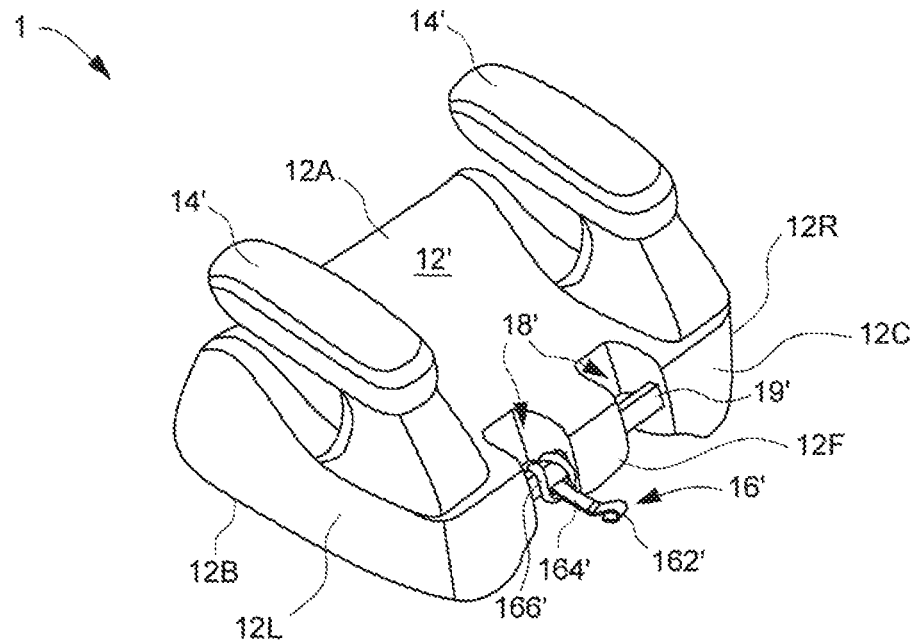
FIGS. 1A and 1B are respectively perspective and enlarged views illustrating an embodiment of a child seat provided with an anchoring harness.

FIG. 1A is a perspective view illustrating an embodiment of a child seat 1. The child seat 1 has no backrest, and can be used as a booster seat. The child seat 1 can include a seat portion 12', two armrests 14' and an anchoring harness 16'. The seat portion 12' can be formed from a seat shell, and can have an upper surface 12A on which a child can sit, and a lower surface 12B opposite to the upper surface 12A that can rest in contact on a support surface (e.g., the upper support surface of a vehicle passenger's seat). The seat portion 12' can also have a rear edge 12C and left and right outer side surfaces 12L and 12R that define at least partially the outer side contour of the seat portion 12'. The rear edge 12C can correspond to a back side of a child, and can define a rear border of the upper surface 12A and the lower surface 12B. The left and right outer side surfaces 12L and 12R can be respectively flanked at the left and right sides of the upper surface 12A. The seat portion 12' may be formed in a single body, and the lower surface 12B may form a substantially planar bottom surface for facilitating resting of the child seat 1 on a support surface.

As shown in FIG. 1A, the seat portion 12' can also be provided with two slots 18' that may be transversally spaced apart from each other in a region between the armrests 14' and adjacent to the rear edge 12C. A material portion 12F of the seat portion 12' can be interposed between the two slots 18'. Each of the slots 18' can extend substantially vertically through the seat portion 12', and respectively open on the upper surface 12A and the lower surface 12B. Moreover, each slot 18' can have a bar segment 19' that extends transversally adjacent to the slot 18'. The two slots 18' and bar segments 19' can be respectively located adjacent to the armrests 14', and are exposed outward and accessible from an outside of the seat portion 12'.

The armrests 14' can protrude upward from the upper surface 12A adjacent to the left and right outer side surfaces 12L and 12R, and extend to near the rear edge 12C. In some embodiments, the armrests 14' may be formed integral with the seat portion 12'. In other embodiments, the armrests 14' may be detachably assembled with the seat portion 12'.

Figure 1B:
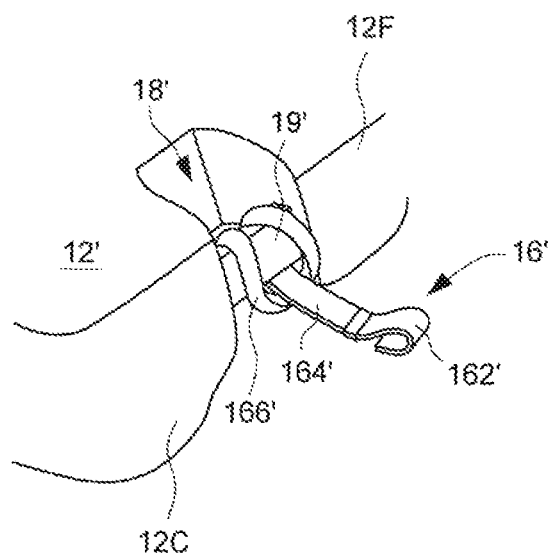

FIG. 1B is an enlarged view illustrating the assembly of the anchoring harness 16' with the seat portion 12'. The anchoring harness 16' can be secured with the seat portion 12' near the rear edge 12C and at least one armrest 14' by wrapping around the bar segment 19'. The anchoring harness 16' can include a fastener 162' and a strap 164'. In some embodiments, the fastener 162' may be formed with a hook shape adapted to attach with an external anchorage fixture (e.g., ring fixture) provided in the vehicle. In other embodiments, the fastener 162' may take any forms adapted to engage with the anchorage fixture.

The strap 164' can be made of a webbing material having a first end connected with the fastener 162', and a second end that forms a loop 166'. The anchoring harness 16' can be detachably assembled with the seat portion 12' by routing the strap 164' substantially vertically through one slot 18' and wrapping the loop 166' around the bar segment 19'. The end of the strap 164' provided with the fastener 162' then can be stretched rearward through the loop 166' to tie the strap 164' with the bar segment 19'. Accordingly, the strap 164' can be secured with the seat portion 12' at one end, and the fastener 162' at the opposite end can be attached with an anchorage fixture (e.g., a ring fixture) provided in the vehicle for holding the child seat 1 on the vehicle passenger's seat.

According to the design needs, the anchoring harness 16' can include two similar assemblies of the same fasteners 162' and straps 164' connected with the seat portion 12', the loop 166' of each strap 164' being secured around one corresponding bar segment 19'.

Figure 2A:
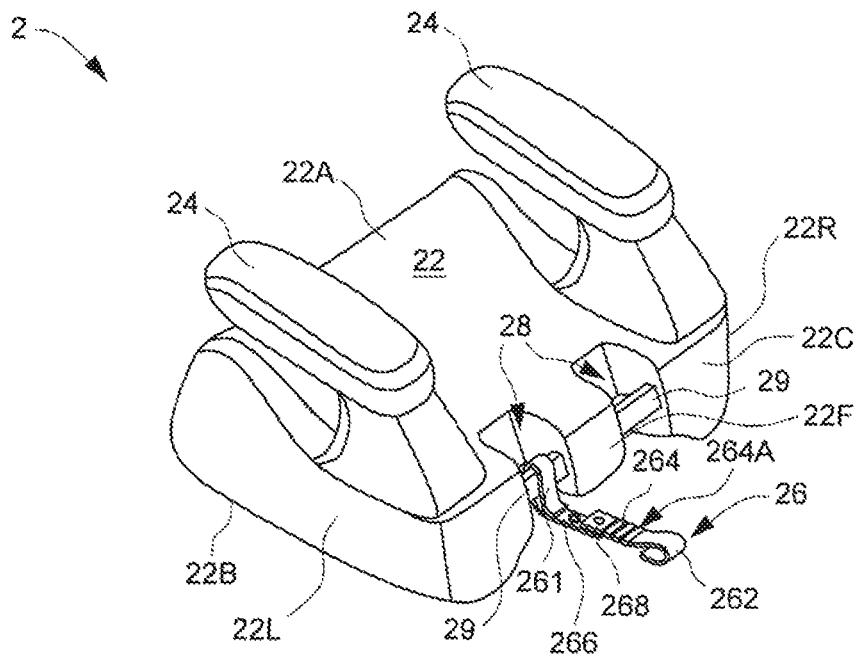
FIGS. 2A and 2B are respectively perspective and enlarged views illustrating a variant embodiment of a child seat provided with an anchoring harness.

FIG. 2A is a perspective view illustrating another variant embodiment of a child seat 2. The child seat 2 can include a seat portion 22, two armrests 24, and an anchoring harness 26 that can detachably assemble with the seat portion 22. Like previously described, the seat portion 22 can have an upper and a lower surface 22A and 22B, a rear edge 22C, and left and right outer side surfaces 22L and 22R. The seat portion 22 can have two slots 28 and bar segments 29 that are arranged adjacent to the rear edge 22C and are spaced apart from each other by a material portion 22F of the seat portion 22. The seat portion 22, the armrests 24, the slots 28 and the bar segments 29 may be similar to the embodiment described previously.

Figure 2B:
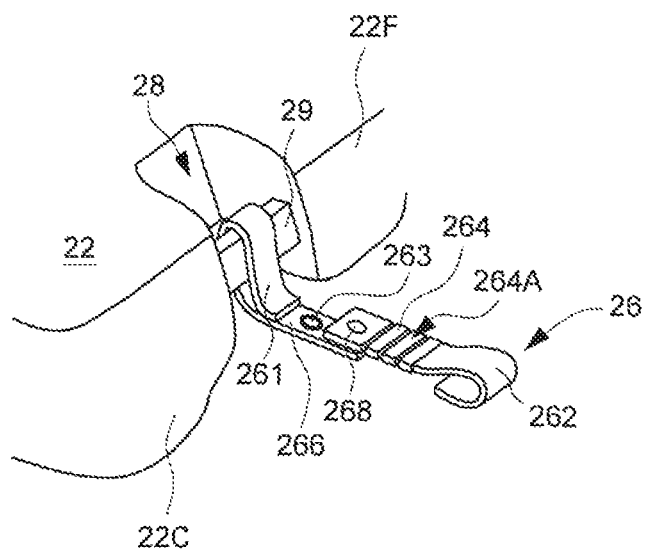

FIG. 2B is an enlarged view illustrating the assembly of the anchoring harness 26 with the seat portion 22. The anchoring harness 26 can be secured with the seat portion 22 at the rear edge 22C by wrapping around the bar segment 29. The anchoring harness 26 can include a fastener 262, and a strap comprised of a first strap portion 264 and a second strap portion 266. The first strap portion 264 can be made of a resilient material that can elastically deform (i.e., stretch and retract) so as to operate as a length adjustment part for facilitating adjustment of the length of the anchoring harness 26 between the fastener 262 and the rear edge 22C of the seat portion 22. The first strap portion 264 can have a first end connected with the fastener 262, and a second end provided with a connector 268 (e.g., button).

The second strap portion 266 can be made of a webbing material, and can have a first end that forms a loop 261 and a second end having a plurality of connectors 263 (e.g., slotted connectors) with any of which the connector 268 of the first strap portion 264 can detachably engage to attach the first strap portion 264 with the second strap portion 266.

It is worth noting the arrangement of the connectors 263 and 268 can be interchanged on the first and second strap portions 264 and 266 (e.g., the connectors 263 can be placed on the first strap portion 264, and the connector 268 on the second strap portion 266). Moreover, more or less of the connectors 263 can be provided according to the actual design needs.

For installing the anchoring harness 26 with the seat portion 22, the loop 261 of the second strap portion 266 can be wrapped around one bar segment 29, whereby the second strap portion 266 is securely retained with the seat portion 22. The connector 268 can be selectively engaged with any of the connectors 263 to attach the first strap portion 264 with the second strap portion 266 at a desirable length.

When the child seat 2 is installed on a vehicle passenger's seat, the first strap portion 264 can be stretched rearward of the seat portion 22, and the fastener 262 can be attached with the anchorage fixture provided in the vehicle. The child seat 2 can be thereby securely held on the vehicle passenger's seat.

When the child seat 2 is to be removed, the fastener 262 can be detached from the anchorage fixture of the vehicle. In alternate embodiments, the connector 268 can be disengaged from the connector 263 to detach the first strap portion 264 from the second strap portion 266. After removal of the child seat 2, the first strap portion 264 can remain attached with the anchorage fixture of the vehicle, whereas the second strap portion 266 remains attached with the seat portion 22.

According to the design needs, the anchoring harness 26 can include two similar assemblies of the fastener 262 and strap portions 264 and 266 attached with the seat portion 12, the loop 261 of each second strap portion 266 being secured around one corresponding bar segment 29.

Figure 3A:
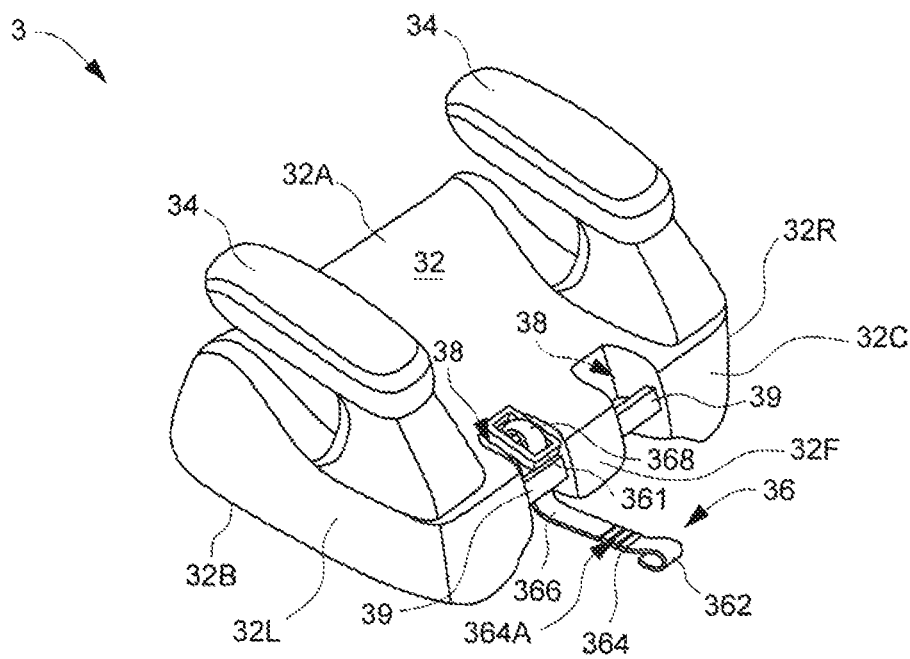
FIGS. 3A and 3B are respectively perspective and enlarged views illustrating a variant embodiment of a child seat provided with an anchoring harness.

FIG. 3A is a perspective view illustrating another variant embodiment of a child seat 3. The child seat 3 can include a seat portion 32, two armrests 34, and an anchoring harness 36 that can be detachably assembled with a rear of the seat portion 32. Like previously described, the seat portion 32 can have an upper and a lower surface 32A and 32B, a rear edge 32C, and left and right outer side surfaces 32L and 32R. The seat portion 32 can have two slots 38 and bar segments 39 that are arranged adjacent to the rear edge 32C and are spaced apart from each other by a material portion 32F of the seat portion 32. The seat portion 32, the armrests 34, the slots 38 and bar segments 39 can be similar to the embodiments described previously.

Figure 3B:
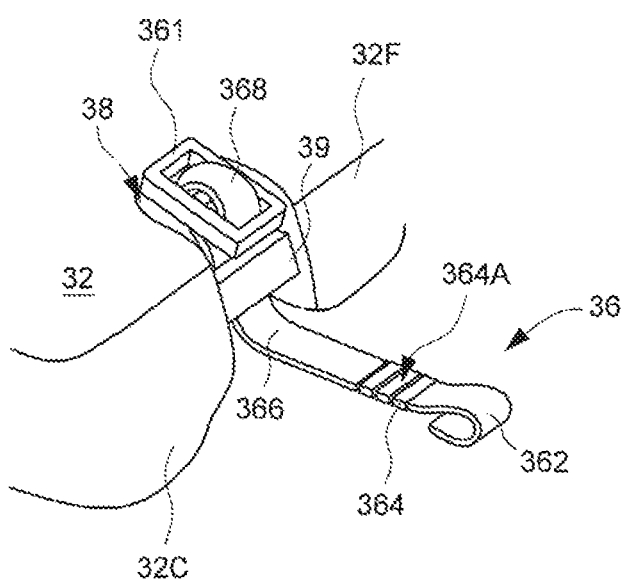

FIG. 3B is an enlarged view illustrating the assembly of the anchoring harness 36 with the seat portion 32. The anchoring harness 36 can be secured with the seat portion 32 near the rear edge 32C by wrapping at least partially around the bar segment 39. The anchoring harness 36 can include a fastener 362, and a strap comprised of a first strap portion 364 and a second strap portion 366. The first strap portion 364 can be made of a resilient material that can elastically deform (i.e., stretch and retract) to operate as a length adjustment element 364A for facilitating adjustment of the length of the anchoring harness 36. The first strap portion 364 can have a first end connected with the fastener 362, and a second end connected with the second strap portion 366. An end of the second strap portion 366 opposite to that connected with the first strap portion 364 can form a loop 368 that is assembled with a stop ring 361.

For installing the anchoring harness 36 with the seat portion 32, the stop ring 361 and the second strap portion 366 can be routed substantially vertically through one slot 38 from the underside of the seat portion 32, and the stop ring 361 can be disposed so that it lies across the slot 38 from the upper side. When the anchoring harness 46 is pulled rearward, the ring 361 can rest in contact against a top of one bar segment 39 and/or the upper surface 32A of the seat portion 32 surrounding the slot 38 to retain the anchoring harness 46 with the seat portion 32.

In some variant embodiments, the stop ring 361 and the second strap portion 366 may also be routed substantially vertically through one slot 38 from the upper side of the seat portion 32, and the stop ring 361 can be disposed so that it lies across the slot 38 from the underside. This installation can also secure the anchoring harness 46 with the seat portion 32.

When the child seat 3 is installed on a vehicle passenger's seat, the first strap portion 364 can be stretched rearward of the seat portion 32, so that the fastener 362 can be attached with the anchorage fixture provided in the vehicle.

When the child seat 3 is to be removed, the ring 361 can be turned substantially vertically relative to the slot 38, and the second strap portion 366 can be pulled such that the ring 361 can be removed from the upper side of the slot 38. After removal of the seat portion 32 from the vehicle passenger's seat, the anchoring harness 36 can be left attached with the anchorage fixture of the vehicle and detached from the seat portion 32.

According to the design needs, the anchoring harness 36 can include two similar assemblies of the fastener 362 and strap portions 364 and 366 attached with the bar segments 39 of the seat portion 32.

Figure 4A:
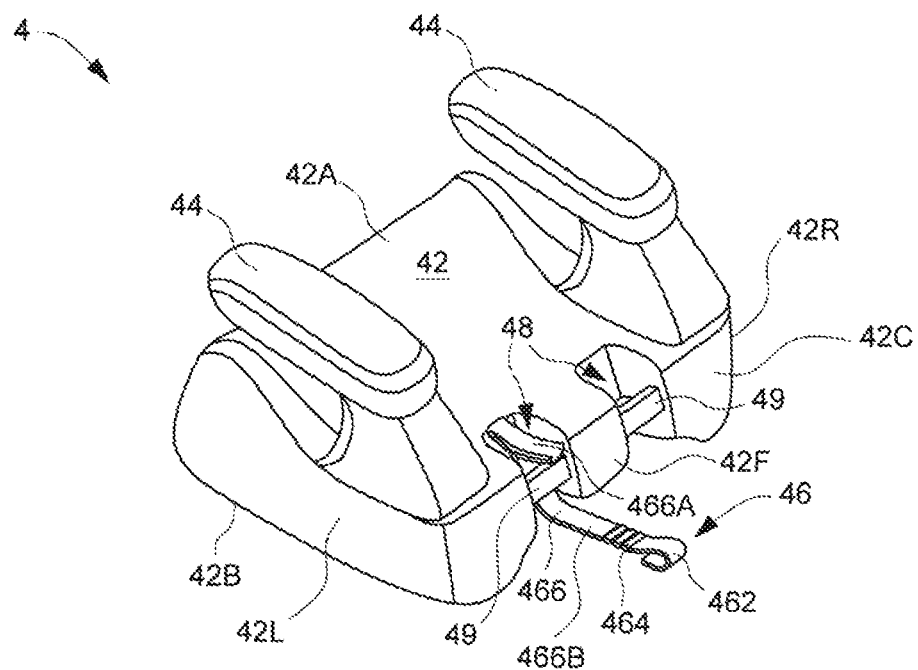
FIGS. 4A and 4B are respectively perspective and enlarged views illustrating a variant embodiment of a child seat provided with an anchoring harness.

FIG. 4A is a perspective view illustrating another variant embodiment of a child seat 4. The child seat 4 can include a seat portion 42, two armrests 44, and an anchoring harness 46 that can be detachably assembled with a rear of the seat portion 42. Like previously described, the seat portion 42 can have an upper and a lower surface 42A and 42B, a rear edge 42C, and left and right outer side surfaces 42L and 42R. The seat portion 42 can have two slots 48 and bar segments 49 that are arranged adjacent to the rear edge 42C and are spaced apart from each other by a material portion 42F of the seat portion 42. The seat portion 42, the armrests 44, the slots 48 and the bar segments 49 may be similar to the embodiments described previously.

Figure 4B:
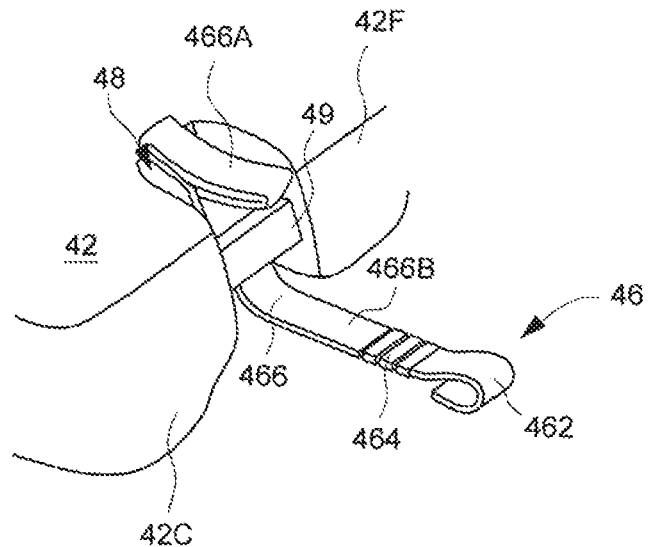

FIG. 4B is an enlarged view illustrating the assembly of the anchoring harness 46 with the seat portion 42. The anchoring harness 46 can be secured with the seat portion 42 adjacently to the rear edge 42C by wrapping at least partially around the bar segment 49. The anchoring harness 46 can include a fastener 462, and a strap comprised of a first strap portion 464 and a second strap portion 466. The first strap portion 464 can be made of a resilient material that can elastically deform (i.e., stretch and retract) for modifying the length of the anchoring harness 46, thereby facilitating the attachment of the anchoring harness 46 and providing some degree of cushioning effect. The first strap portion 464 can have a first end connected with the fastener 462, and a second end connected with the second strap portion 466.

The second strap portion 466 can be made of a material different from the first strap portion 464, e.g., webbing material. An end of the second strap portion 466 opposite to that connected with the first strap portion 464 can be folded over itself and sewed together to form an abuttal part 466A having an enlarged shape. An intermediate region 466B of the second strap portion 466 can be defined between the abuttal part 466A and the first strap portion 464.

For installing the anchoring harness 46 with the seat portion 42, the abuttal part 466A and the second strap portion 466 can be inserted substantially vertically through one slot 48 from the underside of the seat portion 42, and the enlarged shape of the abuttal part 466A can be placed so that it lies across the slot 48 from the upper side. When the anchoring harness 46 is stretched rearward, the abuttal part 466A can rest in contact against a top of one bar segment 49 and/or the upper surface 42A of the seat portion 42 surrounding the slot 48. The anchoring harness 46 can be thereby securely retained with the seat portion 42.

When the child seat 4 is installed on a vehicle passenger's seat, the first strap portion 464 can be stretched rearward of the seat portion 42, and the fastener 462 can be attached with the anchorage fixture provided in the vehicle.

When the child seat 4 is to be removed, the abuttal part 466A can be turned substantially vertically relative to the slot 48, and the second strap portion 466 can be pulled downward such that abuttal part 466A disengages from the upper side of the slot 48. After removal of the seat portion 42 from the vehicle passenger's seat, the anchoring harness 46 can remain attached with the anchorage fixture of the vehicle and detached from the seat portion 42.

According to the design needs, the anchoring harness 46 can include two similar assemblies of the fastener 462 and strap portions 464 and 466 attached with the bar segments 49 of the seat portion 42.

Figure 5A:
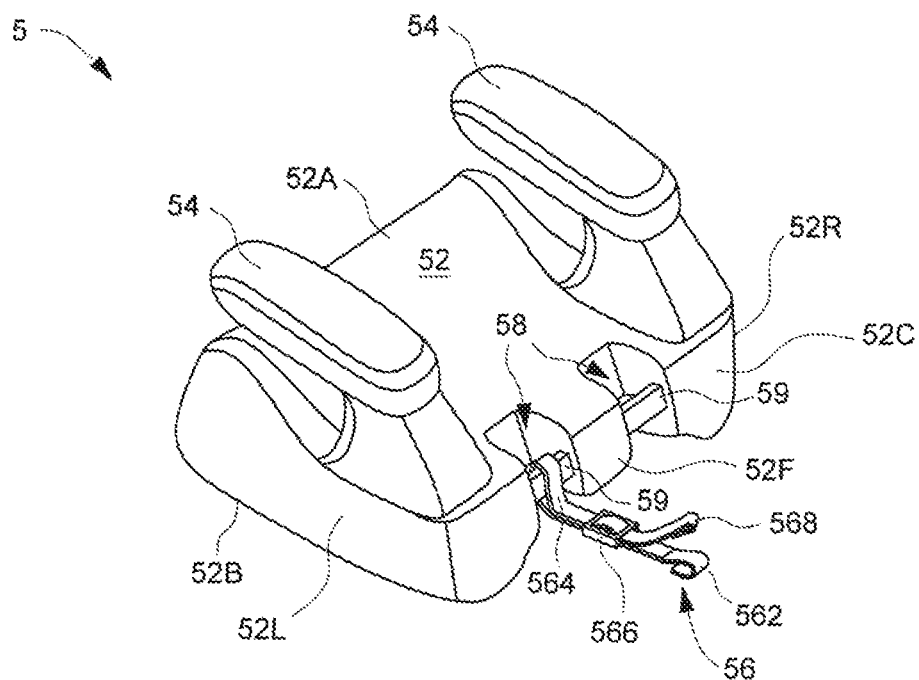
FIGS. 5A and 5B are respectively top and enlarged views illustrating a variant embodiment of a child seat provided with an anchoring harness.

FIG. 5A is a perspective view illustrating another embodiment of a child seat 5. The child seat 5 can include a seat portion 52, two armrests 54, and an anchoring harness 56 assembled with the seat portion 52. Like previously described, the seat portion 52 can have an upper and a lower surface 52A and 52B, a rear edge 52C, and left and right outer side surfaces 52L and 52R. The seat portion 52 can have two slots 58 and bar segments 59 that are arranged adjacent to the rear edge 52C and are spaced apart from each other by a material portion 52F of the seat portion 52. The seat portion 52, the armrests 54, the slots 58 and the bar segments 59 may be similar to the embodiments described previously.

Figure 5B:
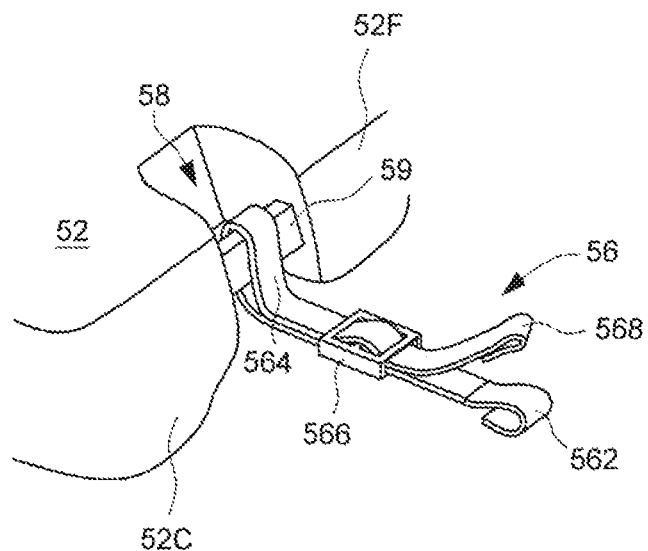

FIG. 5B is an enlarged view illustrating the assembly of the anchoring harness 56 with the seat portion 52. The anchoring harness 56 can be secured with the seat portion 52 adjacently to the rear edge 52C by wrapping around the bar segment 59. The anchoring harness 56 can include a fastener 562, a strap 564 and a three-bar adjustment buckle 566. The strap 564 can be formed from a webbing material having a first end connected with the fastener 562, and a second end that is folded and sewed to form a looped tab 568. The strap 564 can pass substantially vertically through one slot 58 and wrap around the bar segment 59, and then be routed through the adjustment buckle 566. The adjustment buckle 56 can be operable as a length adjustment device for desirably adjusting a length of the strap 564 between the fastener 562 and the rear edge 52C of the seat portion 52.

When the child seat 5 is installed on a vehicle passenger's seat, the fastener 562 can be attached with the anchorage fixture of the vehicle to hold the child seat 11 in place. Owing to the friction contact between the strap 564 and the adjustment buckle 566, the strap 564 cannot easily slide relative to the adjustment buckle 566. When the position of the child seat 5 on the vehicle passenger's seat needs adjustment, the adjustment buckle 566 can be movably displaced relative to the strap 564 so as to adjust the length of the strap 564 between the seat portion 52 and the anchorage fixture of the vehicle.

Figure 6A:
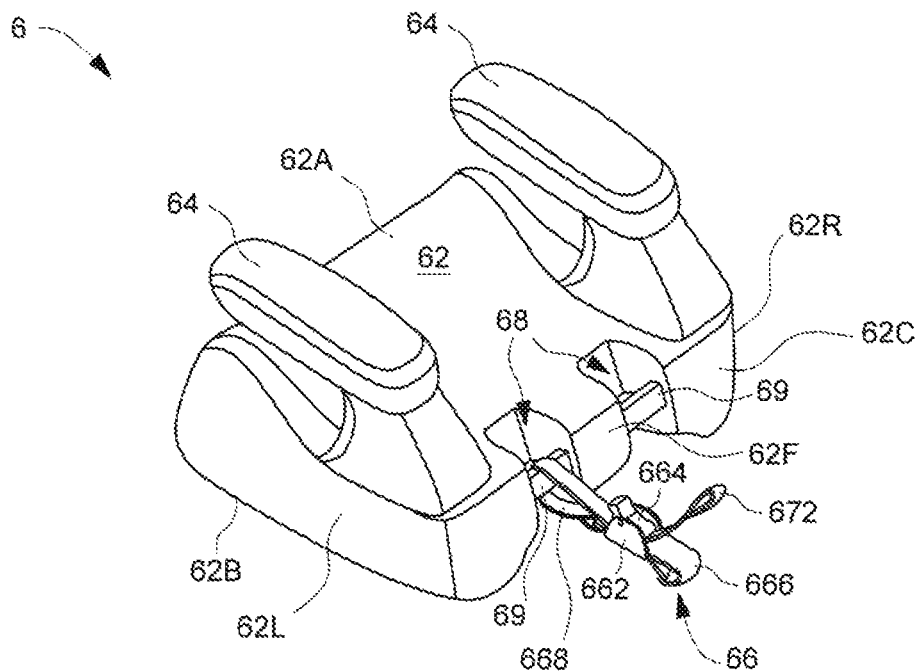
FIGS. 6A-6D are schematic views illustrating another variant embodiment of a child seat provided with an anchoring harness.

FIG. 6A is a schematic view illustrating another variant embodiment of a child seat 6. The child seat 6 can include a seat portion 62, two armrests 64, and an anchoring harness 66 assembled with the seat portion 62. Like previously described, the seat portion 62 can have an upper and a lower surface 62A and 62B, a rear edge 62C, and left and right outer side surfaces 62L and 62R. The seat portion 62 can have two slots 68 and bar segments 69 that are arranged adjacent to the rear edge 62C and are spaced apart from each other by a material portion 62F of the seat portion 62. The seat portion 62, the armrests 64, the slots 68 and the bar segments 69 may be similar in construction to the embodiments described previously.

Figure 6B:
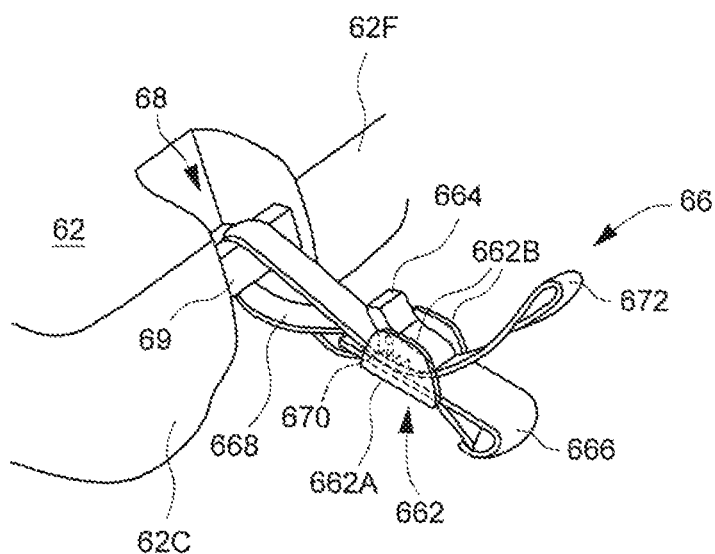

FIG. 6B is an enlarged view illustrating the assembly of the anchoring harness 66 with the seat portion 62. The anchoring harness 66 can be secured with the seat portion 62 adjacently to the rear edge 62C by wrapping around the bar segment 69. The anchoring harness 66 can include a length adjustment device comprised of a mount frame 662 and a clamping part 664, a fastener 666 and a strap 668.

The mount frame 662 can be a hollow housing including a bottom 662A and two sidewalls 662B. The clamping part 664 can be disposed between the two sidewalls 662B, and pivotally connected with the mount frame 662. The clamping part 664 can include a plurality of teeth 670 facing the bottom 662A. The fastener 666 can be affixed with the mount frame 662, e.g., at the bottom 662A. The assembly of the fastener 666, the mount frame 662 and the clamping part 664 can be located behind the bar segment 69.

The strap 668 can be made of a webbing material having a first end affixed with the fastener 666 (as shown) or the mount frame 662, and a second end that forms a looped tab 672. The strap 668 also includes an intermediate portion that is routed substantially vertically through one slot 68 and wraps around the bar segment 69, and then is routed through the mount frame 662 between the fastener 666 and the clamping part 664. The length adjustment device comprised of the mount frame 662 and the clamping part 664 can be operable to hold and adjust the strap 668, and the looped tab 672 can prevent the strap 668 from entirely disengaging from the mount frame 662 and the clamping part 664.

Figure 6C:
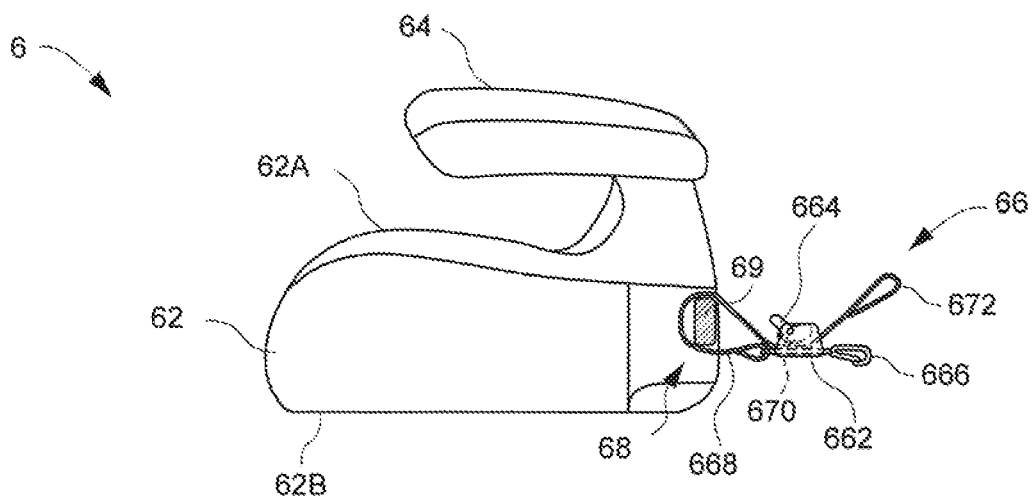
Figure 6D:
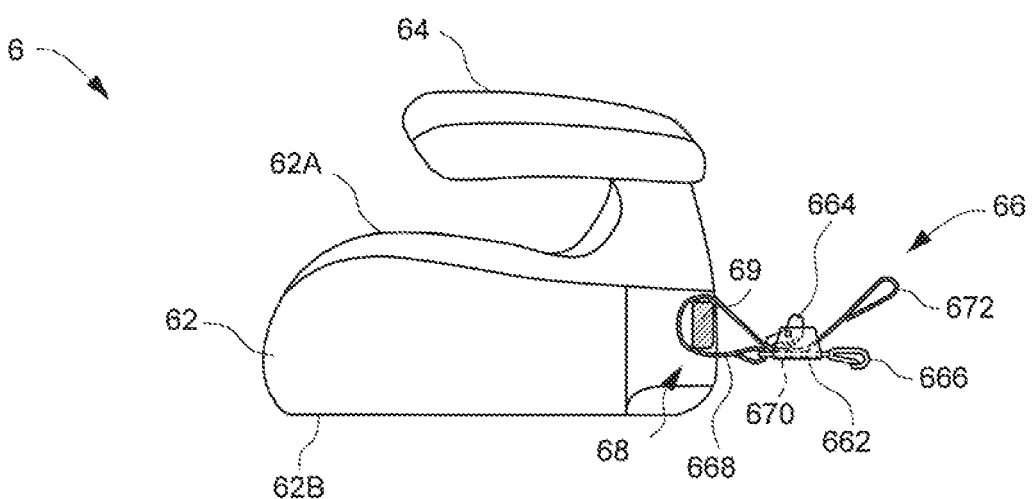

FIGS. 6C and 6D are schematic side views respectively illustrating a locked and a release state of the anchoring harness 66. When the child seat 6 is installed on a vehicle passenger's seat, the fastener 666 can be attached with the anchorage fixture of the vehicle. The clamping part 664 can be operable so that the teeth 670 press and clamp a portion of the strap 668 against a surface of the fastener 666, as shown in FIG. 6C. The length of the strap 668 extending between the bar segment 69 and the fastener 666 can be thereby fixed, and the anchoring harness 66 can hold the child seat 6 in place.

Referring to FIG. 6D, for adjusting the length of the strap 668 between the fastener 666 and the rear edge 62C of the seat portion 62, the clamping part 664 can be pivoted relative to the mount frame 662 to cause the teeth 670 to disengage from the strap 668. Then the loop 672 or fastener 666 can be pulled to cause the strap 668 to slide through the mount frame 662. Once a desired length of the strap 668 is reached, the clamping part 664 can reversely rotate to clamp the strap 668.

Figure 7A:
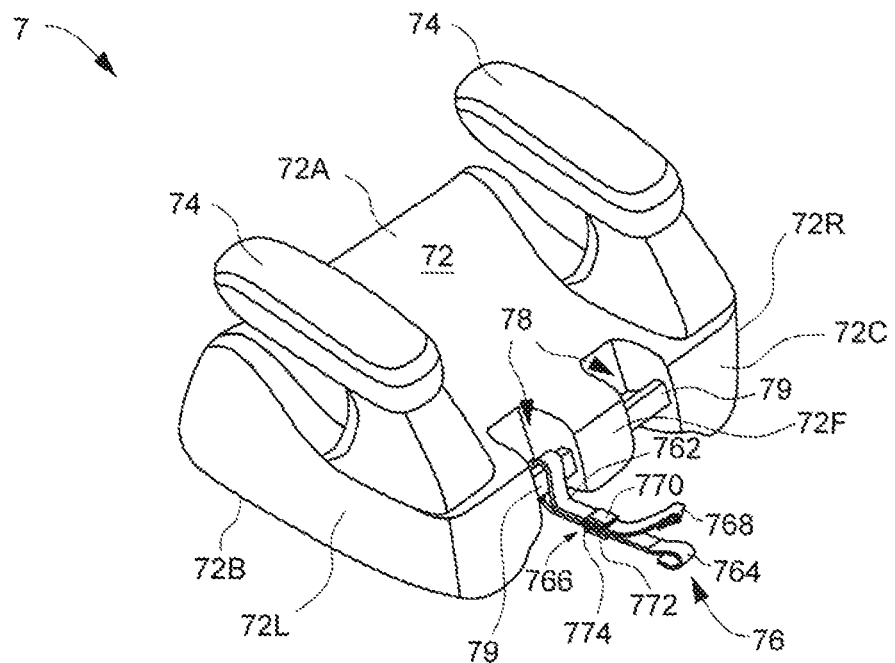
FIGS. 7A and 7B are respectively perspective and enlarged views illustrating another variant embodiment of a child seat provided with an anchoring harness.

FIG. 7A is a perspective view illustrating another variant embodiment of a child seat 7. The child seat 7 can include a seat portion 72, two armrests 74 and an anchoring harness 76 assembled with a rear of the seat portion 72. Like previously described, the seat portion 72 can have an upper and a lower surface 72A and 72B, a rear edge 72C, and left and right outer side surfaces 72L and 72R. The seat portion 72 can have two slots 78 and bar segments 79 that are arranged adjacent to the rear edge 72C and are spaced apart from each other by a material portion 72F of the seat portion 72. The seat portion 72, the armrests 74, the slots 78 and the bar segments 79 may be similar in construction to the embodiments described previously.

Figure 7B:
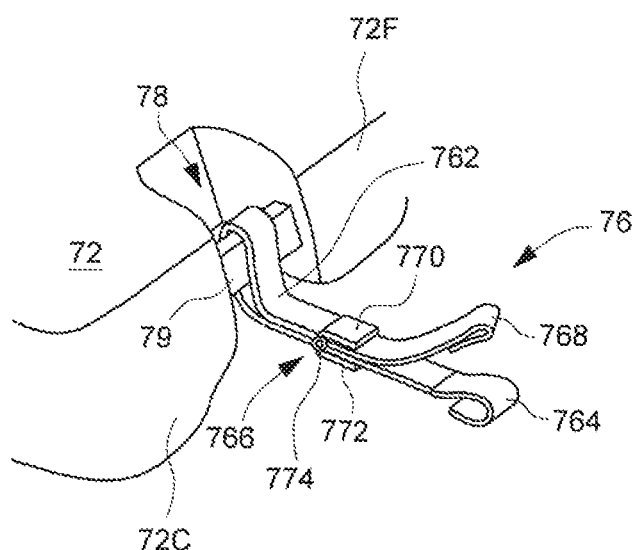

FIG. 7B is an enlarged view illustrating the assembly of the anchoring harness 76 with the seat portion 72. The anchoring harness 76 can be secured with the seat portion 72 adjacently to the rear edge 72C by wrapping around the bar segment 79. The anchoring harness 76 can include a strap 762, a fastener 764, and a clipping device 766. The strap 762 can include a first end connected with the fastener 764, and a second end forming a looped tab 768.

Figure 7C:
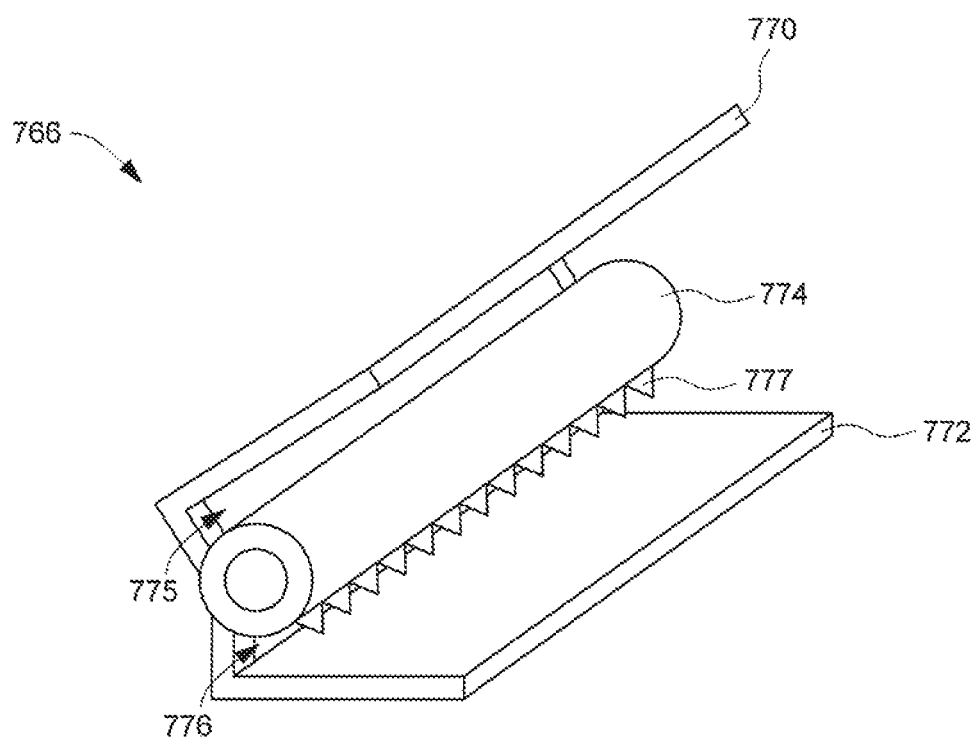
FIGS. 7C-7E are schematic views illustrating the construction and operation of a clipping device implemented in the anchoring harness shown in FIGS. 7A and 7B.

FIG. 7C is a schematic view illustrating the clipping device 766. The clipping device 766 can include a clamping plate 770, a base 772, and a pivot shaft 774 through which the clamping plate 770 is pivotally assembled with the base 772. A gap 775 can be formed between the clamping plate 770 and the pivot shaft 774, and another gap 776 can be defined between the base 772 and the pivot shaft 774. An outer surface of the pivot shaft 774 can include a plurality of teeth 777 facing the base 772. The strap 762 can be routed substantially vertically through one slot 78, and then wrap around one adjacent bar segment 79 to form two parallel and overlapping strap segments A and B that are routed through the gaps 775 and 776 defined between the base 772, the pivot shaft 774 and the clamping plate 770. The fastener 764 and the loop 768 can be thereby located at a same side of the clipping device 766 opposite to the side of the bar segment 79. The clipping device 766 can be configured as a length adjustment device for adjusting a length at which the fastener 764 extends rearward distant from the rear of the seat portion 72, the looped tab 768 preventing the strap 762 from sliding out of the clipping device 766.

Figure 7D:
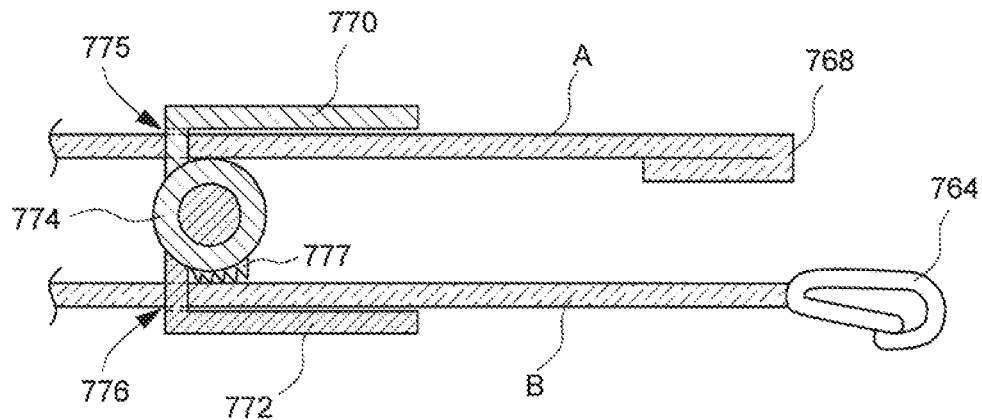
Figure 7E:
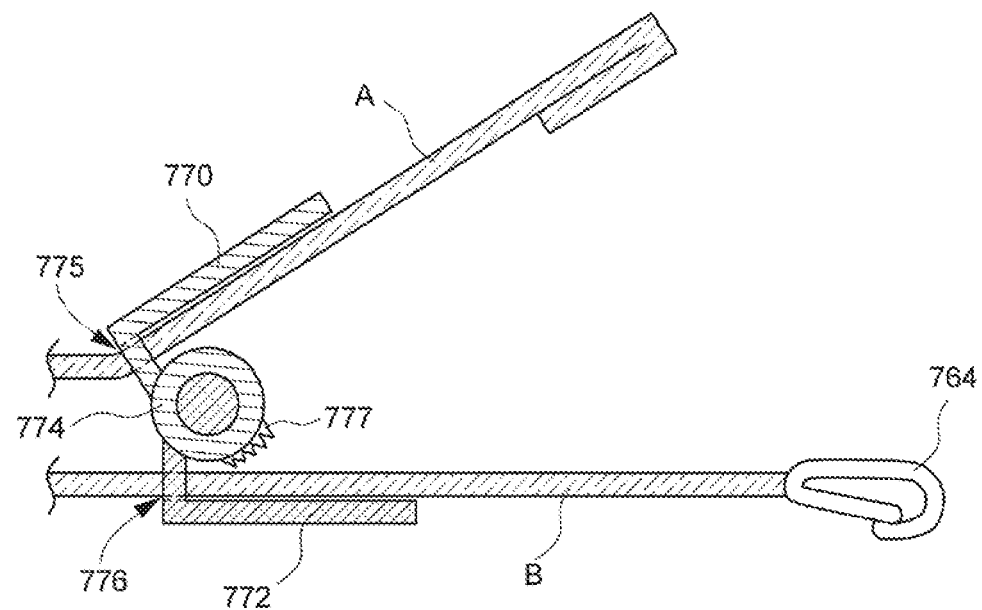

FIGS. 7D and 7E are schematic views respectively illustrating the clipping device 766 in clamping and unclamping states. In FIG. 7D, the clipping device 766 is shown clamping the strap 762. A first strap segment A of the strap 762 routed through the gap 775 can have two opposite surfaces respectively squeezed in contact against the clamping plate 770 and the pivot shaft 774, whereas another strap segment B of the strap 762 routed through the gap 776 can have two opposite surfaces respectively squeezed in contact against the teeth 777 of the pivot shaft 774 and the base 772. Accordingly, the strap segments A and B can be prevented through the gaps 775 and 776 of the clipping device 766. Once the child seat 7 is installed on a vehicle passenger's seat, this clamping action can block the strap 762 from sliding through the clipping device 766. Accordingly, the anchoring harness 76 can securely hold the child seat 7 in place.

In FIG. 7E, the clipping device 766 is shown unclamping the strap 762. The clamping plate 770 and the pivot shaft 774 can be rotated relative to the base 772 for disengaging the teeth 777 from the strap segment B. Accordingly, the strap segments A and B can be unclamped, and can respectively slide through the gaps 775 and 776 for adjusting the strap length between the fastener 764 and the rear edge 72C of the seat portion 72.

Figure 8A:
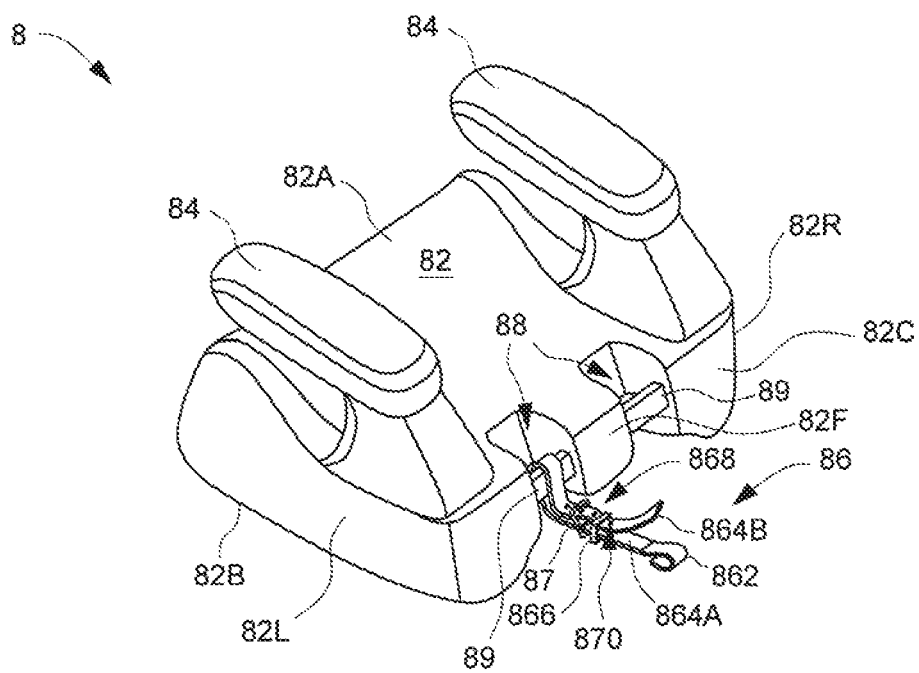
FIGS. 8A and 8B are respectively perspective and enlarged views illustrating another variant embodiment of a child seat provided with an anchoring harness.

FIG. 8A is a perspective view illustrating another variant embodiment of a child seat 8. The child seat 8 can include a seat portion 82, two armrests 84 and an anchoring harness 86 assembled with a rear of the seat portion 82. Like previously described, the seat portion 82 can have an upper and a lower surface 82A and 82B, a rear edge 82C, and left and right outer side surfaces 82L and 82R. The seat portion 82 can have two slots 88 and bar segments 89 that are arranged adjacent to the rear edge 82C and are spaced apart from each other by a material portion 82F of the seat portion 82. The seat portion 82, the armrests 84, the slots 88 and the bar segments 89 may be similar in construction to the embodiments described previously.

Figure 8B:
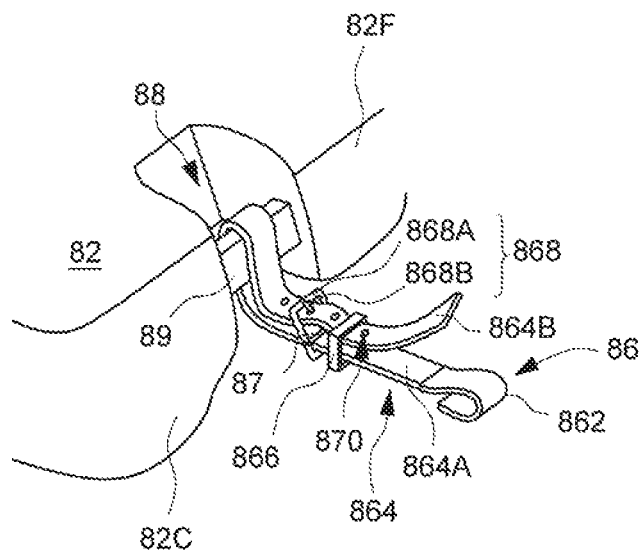

FIG. 8B is an enlarged view illustrating the assembly of the anchoring harness 86 with the seat portion 82. The anchoring harness 86 can be secured with the seat portion 82 adjacently to the rear edge 82C by wrapping around the bar segment 89. The anchoring harness 86 can include a fastener 862, a strap 864, a guide collar 866 and a buckle 868. The fastener 862 can attach with the anchorage fixture of a vehicle when the child seat 8 is installed on a vehicle passenger's seat. The strap 864 can be routed substantially vertically through one slot 88 and wrap around the adjacent bar segment 89 to define a first and a second segment 864A and 864B extending rearward from the bar segment 89. The first segment 864A can have an intermediate portion assembled with the buckle 868, and a distal end connected with the fastener 862. The second segment 864B can be routed through the buckle 868, and pass through the guide collar 866. The second segment 864B can include a plurality of spaced-apart holes 870 with any of which the buckle 868 can selectively engage to set a desired length of the strap 864 between the fastener 862 and the rear edge 82C of the seat portion 82.

The buckle 868 can be securely assembled with the first segment 864A at an intermediate position between the bar segment 89 and the fastener 862. The buckle 868 can exemplary include a frame 868A, and a prong 868B pivotally connected with the frame 868A. The frame 868A can include a pivot shaft 87 at which the first segment 864A can be pivotally connected with the frame 868A. A distal end of the prong 868B can selectively engage through any of the holes 870 and abut against the frame 868A to prevent sliding of the second segment 864B through the frame 868A.

The guide collar 866 can be affixed with the first segment 864A at a location between the buckle 868 and the fastener 862, and adjacent to the buckle 868. The guide collar 866 can have a size adapted to receive the passage of the second segment 864B of the strap 864.

The buckle 868 can operate as a length adjustment device for the strap 864. When the prong 868B is disengaged from the frame 868A and the second segment 864B, the strap 864 can slide through the buckle 868 and the guide collar 866 to adjust the length of the first segment 864A relative to that of the second segment 864B. Once the strap 864 has a desirable length, the prong 868B can engage with the frame 868A through one hole 870 of the second segment 864B to block sliding of the strap 864 through the buckle 868.

Figure 9A:
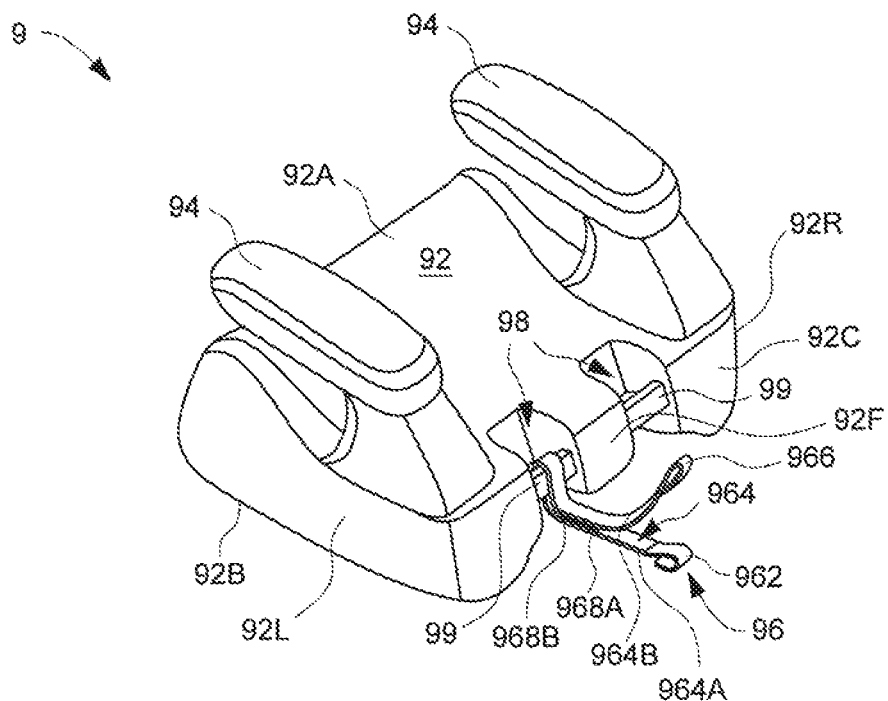
FIGS. 9A-9B are respectively perspective and enlarged views illustrating another embodiment of a child seat provided with an anchoring harness.

FIG. 9A is a perspective view illustrating another variant embodiment of a child seat 9. The child seat 9 can include a seat portion 92, two armrests 94, and an anchoring harness 96 assembled with a rear of the seat portion 92. Like previously described, the seat portion 92 can have an upper and lower surface 92A and 92B, a rear edge 92C, and left and right outer side surfaces 92L and 92R. The seat portion 92 can have two slots 98 and bar segments 99 that are arranged adjacent to the rear edge 92C and are spaced apart from each other by a material portion 92F of the seat portion 92. The seat portion 92, the armrests 94, the slots 98 and the bar segments 99 may be similar in construction to the embodiments described previously.

Figure 9B:
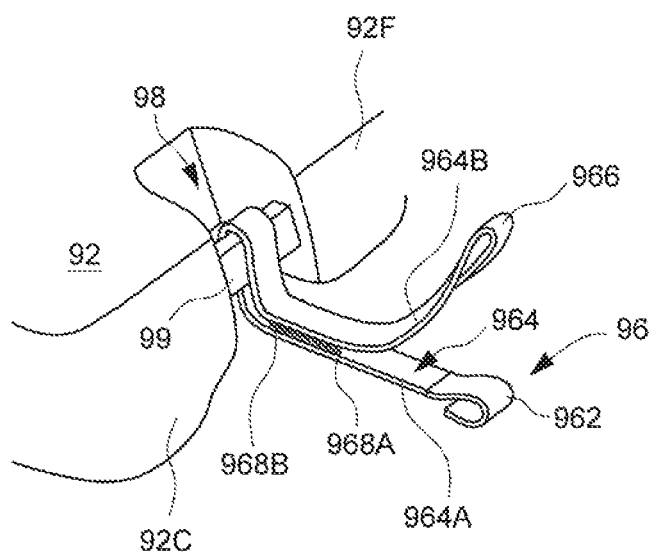

FIG. 9B is an enlarged view illustrating the assembly of the anchoring harness 96 with the seat portion 92. The anchoring harness 96 can be secured with the seat portion 92 adjacently to the rear edge 92C by wrapping around the bar segment 99. The anchoring harness 96 can include a fastener 962 and a strap 964. The strap 964 can be made of a webbing material having a first end connected with the fastener 962, and a second end forming a looped tab 966. The strap 964 can be routed substantially vertically through one slot 98 and wrap around the bar segment 99 to define a first and a second segment 964A and 964B extending rearward from the bar segment 99. The first and second segments 964A and 964B can have mutually facing surfaces provided with hook and loop fasteners 968A and 968B (e.g., Velcro™ fasteners). The hook and loop fasteners 968A and 968B can operate as a length adjustment device for the strap 964.

When the child seat 9 is installed on a vehicle passenger's seat, the fastener 962 can be attached with the anchorage fixture of the vehicle. The hook and loop fasteners 968A and 968B can engage with each other to fix the lengths of the first and second segment 964A and 964B.

The hook and loop fasteners 968A and 968B can be disengaged from each other, such that the lengths of the first and second segments 964A and 964B can be adjusted to set a desired distance from the fastener 962 to the rear of the seat portion 92.

Figure 10A:
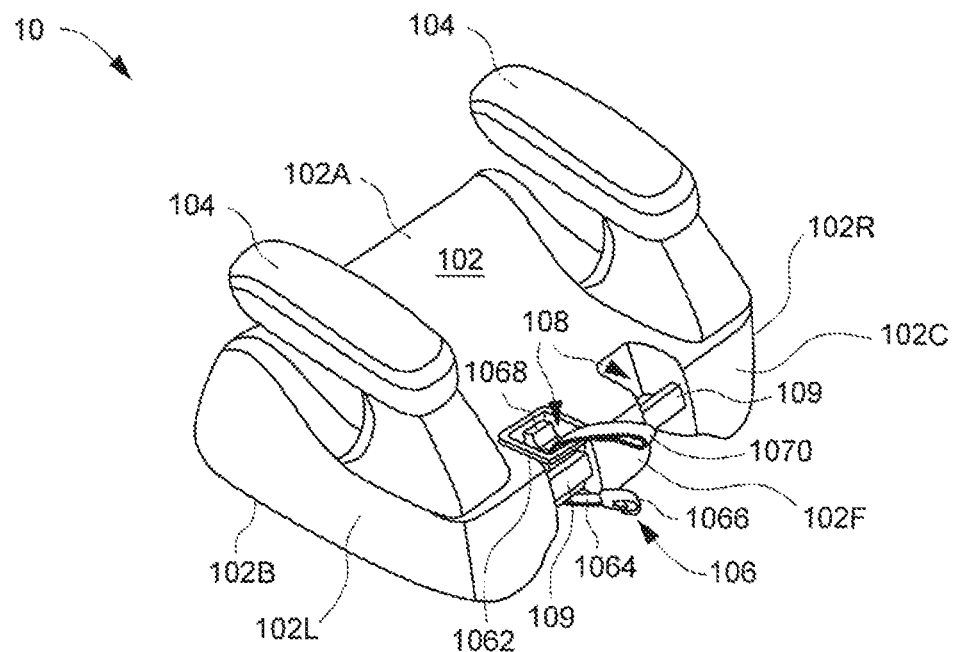
FIGS. 10A-10D are schematic views illustrating another variant embodiment of a child seat provided with an anchoring harness.

FIG. 10A is a perspective view illustrating another variant embodiment of a child seat 10. The child seat 10 can include a seat portion 102, two armrests 104, and an anchoring harness 106 assembled with the seat portion 102. Like previously described, the seat portion 102 can have an upper and lower surface 102A and 102B, a rear edge 102C, and left and right outer side surfaces 102L and 102R. The seat portion 102 can have two slots 108 and bar segments 109 that are arranged adjacent to the rear edge 102C and are spaced apart from each other by a material portion 102F of the seat portion 102. The seat portion 102, the armrests 104, the slots 108 and the bar segments 109 may be similar in construction to the embodiments described previously.

Figure 10B:
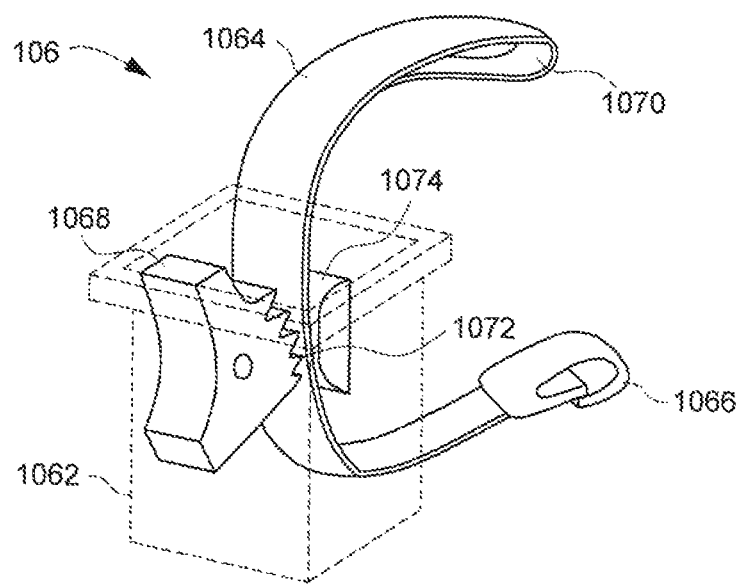

FIG. 10B is a schematic view illustrating the assembly of the anchoring harness 106. The anchoring harness 106 can be secured with the seat portion 102 adjacently to the rear edge 102C by wrapping around the bar segment 109. The anchoring harness 106 can include a mount frame 1062, a strap 1064, a fastener 1066 and a clamping part 1068. The mount frame 1062 can be a hollow housing opened at the top and bottom, and can be affixed through one slot 108 in abutment against one bar segment 109 and an inner sidewall of the slot 108. The strap 1064 can be routed substantially vertically through the slot 108 and the mount frame 1062, and have two segments respectively extending outward from the top and bottom mount frame 1062. The segment of the strap 1064 extending outward from the top of the mount frame 1062 can be folded over itself and sewn to form a looped tab 1070, whereas the segment of the strap 1064 extending outward from the bottom of the mount frame 1062 can be connected with the fastener 1066.

The clamping part 1068 can be disposed in the interior of the mount frame 1062, and pivotally connected with the mount frame 1062. The clamping part 1068 can be provided with a plurality of teeth 1072 facing a raised portion 1074 protruding from an inner sidewall of the mount frame 1062. The strap 1064 can be routed through the interior of the mount frame 1062 and between the clamping part 1068 and the raised portion 1074. The assembly of the mount frame 1062 and clamping part 1068 can form a length adjustment device operable to hold and adjust the strap 1064.

Figure 10C:
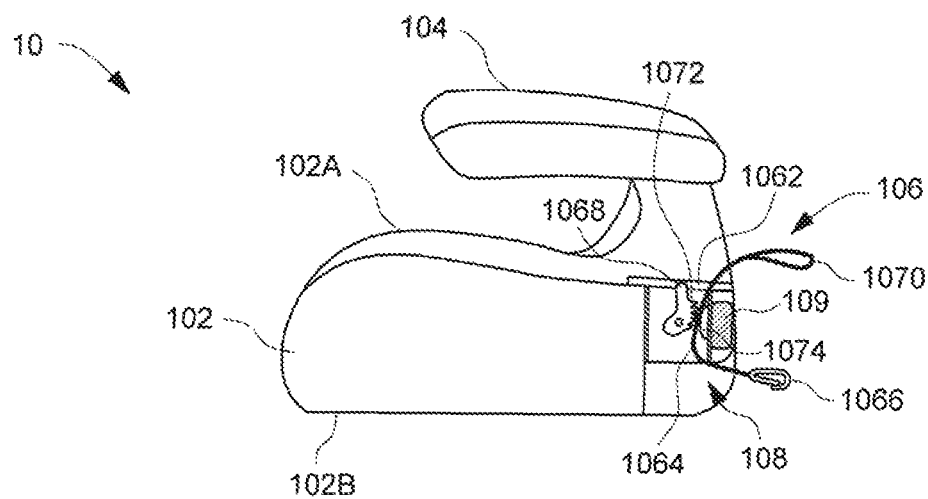
Figure 10D:
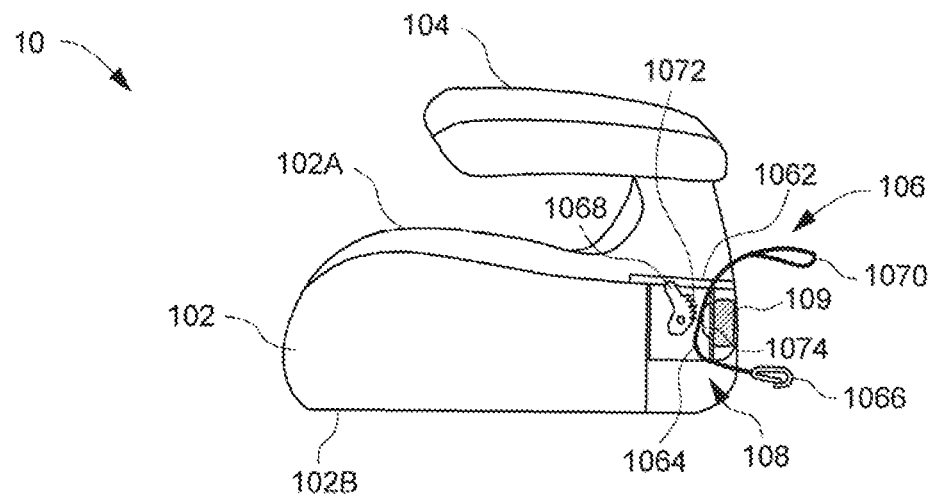

FIGS. 10C and 10D are schematic views respectively illustrating the anchoring harness 106 in a locked and a release state. Referring to FIG. 10C, when the child seat 10 is installed on a vehicle passenger's seat, the fastener 1066 can be attached with the anchorage fixture of the vehicle. The clamping part 1068 then can be operable so that the teeth 1072 can press and clamp an intermediate segment of the strap 1064 against the raised portion 1074. The anchoring harness 106 can thereby securely hold the child seat 10 in place.

Referring to FIG. 10D, for adjusting the length of the strap 1064, the clamping part 1068 can be pivoted to cause the teeth 1072 to disengage from the strap 1064. Then the loop 1070 or fastener 1066 can be pulled to slide and adjust the strap 1064 through the mount frame 1062. Once a desired length of the strap 1064 is reached, the clamping part 1068 can reversely rotate to clamp the strap 1064.

Figure 11:
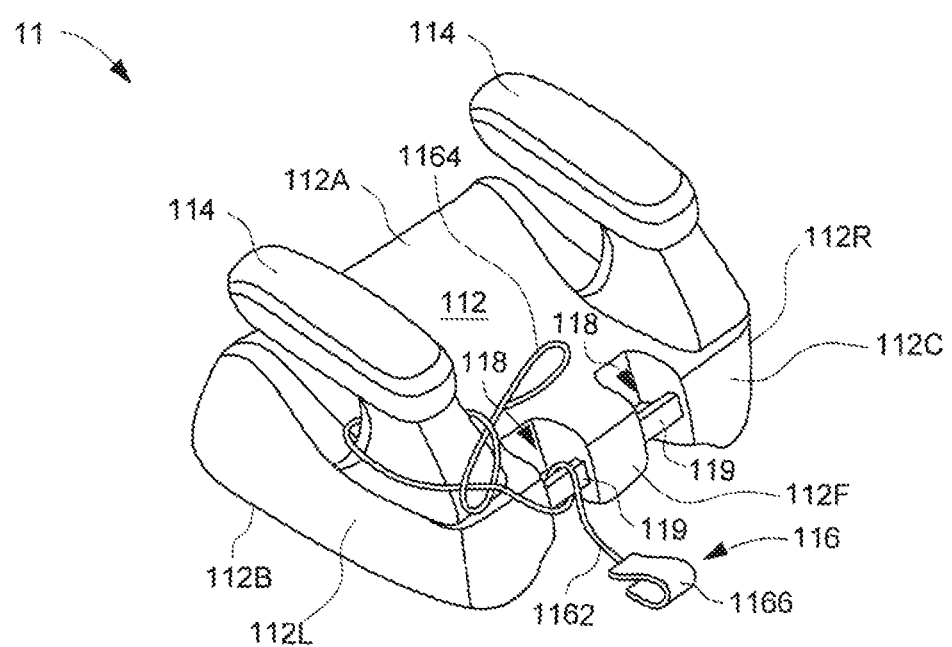
FIG. 11 is a perspective view illustrating another variant embodiment of a child seat provided with an anchoring harness.

FIG. 11 is a perspective view illustrating another variant embodiment of a child seat 11. The child seat 11 can include a seat portion 112, two armrests 114, and an anchoring harness 116 assembled with a rear of the seat portion 112. Like previously described, the seat portion 112 can have an upper and lower surface 112A and 112B, a rear edge 112C, and left and right outer side surfaces 112L and 112R. The seat portion 112 can have two slots 118 and bar segments 119 that are arranged adjacent to the rear edge 112C and are spaced apart from each other by a material portion 112F of the seat portion 112. The seat portion 112, the armrests 114, the slots 118 and the bar segments 119 may be similar in construction to the embodiments described previously.

The anchoring harness 116 can include a strap 1162 and a fastener 1166. The strap 1162 can have a first end connected with the fastener 1166, and a second end forming a loop 1164. The strap 1162 can respectively wrap around one segment bar 119 and one armrest 114 to attach the anchoring harness 116 with the seat portion 112. The armrest 114 and the bar segment 119 around which the strap 1162 can wrap and tie may be located at a same side of the seat portion 112. It is understood that certain embodiments may omit the wrapping around the armrest 114, and the strap 1162 may only wrap and tie around the bar segment 119 to attach the anchoring harness 116 with the seat portion 112. When the child seat 11 is installed on a vehicle passenger's seat, the fastener 1166 can be attached with the anchorage fixture of the vehicle to hold the child seat 11 in place.

Figure 12A:
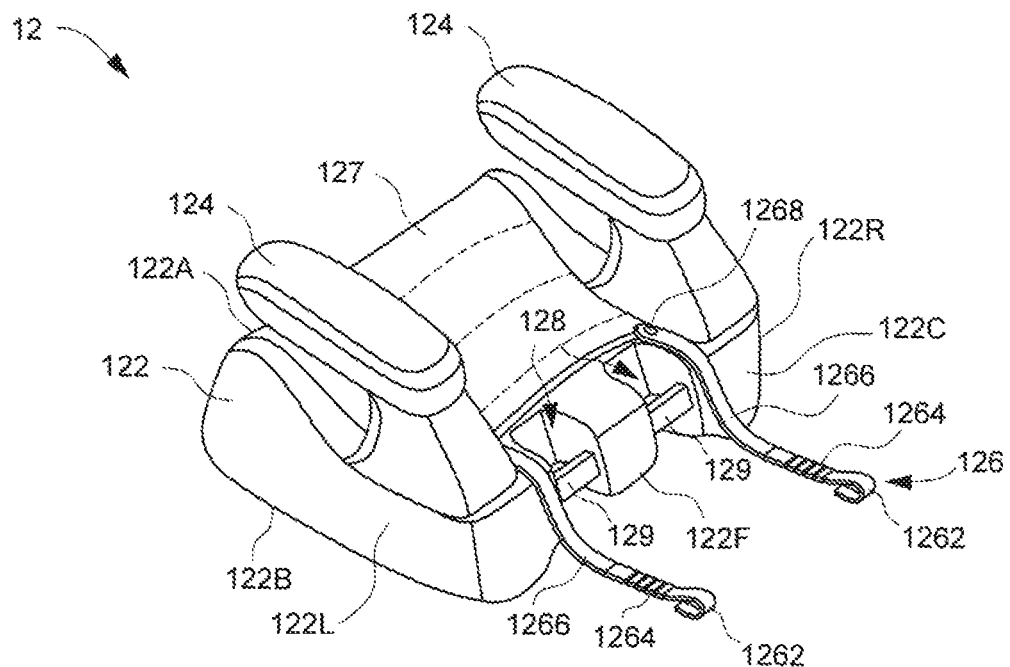
FIGS. 12A and 12B are respectively perspective and side views illustrating another variant embodiment of a child seat provided with an anchoring harness.
Figure 12B:
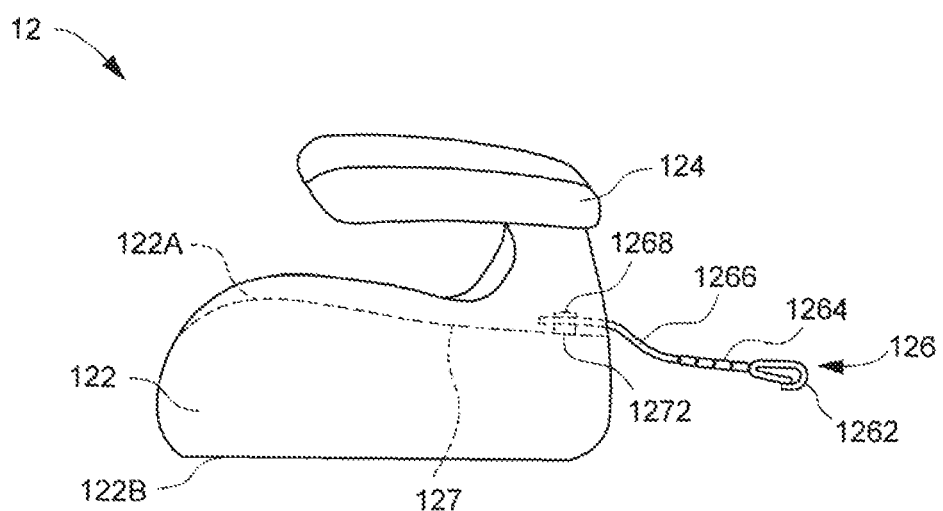

FIGS. 12A and 12B are respectively perspective and side views illustrating another variant embodiment of a child seat 12. The child seat 12 can include a seat portion 122, two armrests 124, and an anchoring harness 126 detachably assembled with the seat portion 122. Like previously described, the seat portion 122 can have an upper and lower surface 122A and 122B, a rear edge 122C, and left and right outer side surfaces 122L and 122R. The seat portion 122 can have two slots 128 and bar segments 129 that are arranged adjacent to the rear edge 122C and are spaced apart from each other by a material portion 122F of the seat portion 122. The seat portion 122, the armrests 124, the slots 128 and the bar segments 129 may be similar in construction to the embodiments described previously.

The upper surface 122A of the seat portion 122 can be provided with a fabric 127. In one embodiment, the fabric 127 may substantially cover the upper surface 122A. Left and right side regions of the fabric 127 adjacent to the armrests 124 can respectively include connectors 1272.

The anchoring harness 126 can include two strap assemblies that are respectively connected with the fabric 127 of the seat portion 122 on the upper surface 122A. The two strap assemblies may be connected with the seat portion 122 at locations adjacent to the rear edge 122C and the inner side surfaces of the armrests 124. The two strap assemblies can have a same construction, each of which including a fastener 1262, and a strap comprised of a first strap portion 1264 and a second strap portion 1266.

The first strap portion 1264 can be made of a resilient material that can elastically deform to stretch and retract. The first strap portion 1264 can have a first end connected with one fastener 1262, and a second end connected with the second strap portion 1266. An end of the second strap portion 1266 opposite to that connected with the first strap portion 1264 can have a connector 1268 operable to detachably engage with the connector 1272. Examples of the connectors 1268 and 1272 can include, without limitation, snap buttons. It will be readily appreciated that the arrangement of the connectors 1268 and 1272 can be interchanged on the fabric 127 and the anchoring harness 126.

For installing the anchoring harness 126 with the seat portion 122, the connectors 1268 and 1272 can be engaged with each other so that the anchoring harness 126 is held with the seat portion 122.

When the child seat 12 is installed on a vehicle passenger's seat, the anchoring harness 126 can be stretched rearward of the seat portion 122, and the fasteners 1262 can be attached with the anchorage fixture of the vehicle.

When the child seat 12 is to be removed, the connectors 1268 and 1272 may be disengaged from each other. After removal of the seat portion 122, the anchoring harness 126 can remain detached from the seat portion 122. It is understood that the child seat 12 may also be removed by disengaging the fasteners 1262 from the anchorage fixture of the vehicle.

Figure 13A:
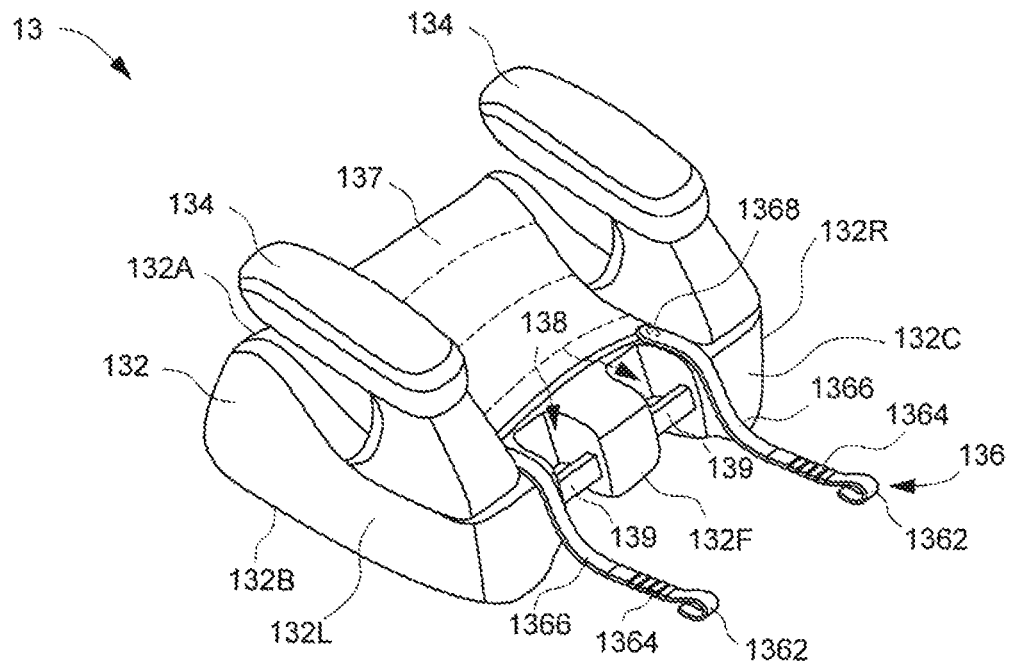
FIGS. 13A and 13B are respectively perspective and side views illustrating another variant embodiment of a child seat provided with an anchoring harness.
Figure 13B:
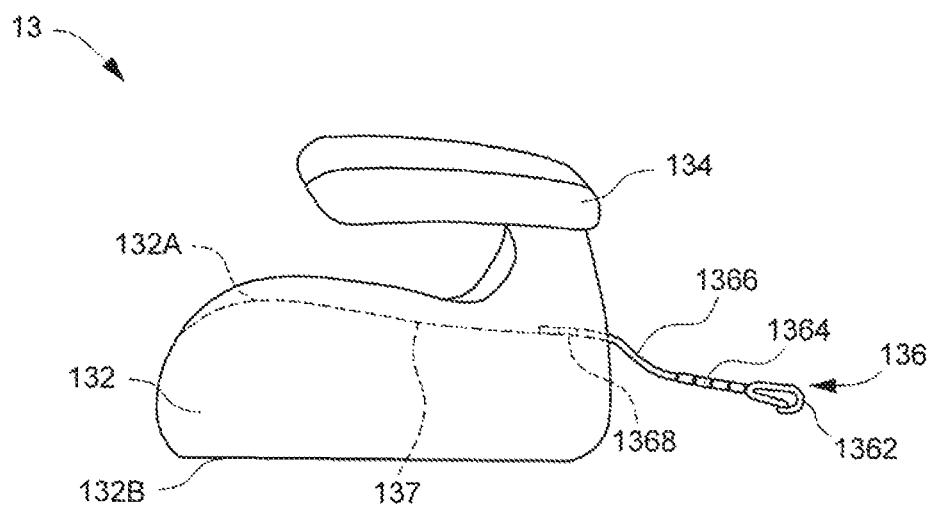

FIGS. 13A and 13B are respectively perspective and side views illustrating another variant embodiment of a child seat 13. The child seat 13 can include a seat portion 132, two armrests 134, and an anchoring harness 136 assembled with the seat portion 132. Like previously described, the seat portion 132 can have an upper and lower surface 132A and 132B, a rear edge 132C, and left and right outer side surfaces 132L and 132R. The seat portion 132 can have two slots 138 and bar segments 139 that are arranged adjacent to the rear edge 132C and are spaced apart from each other by a material portion 132F of the seat portion 132. The seat portion 132, the armrests 134, the slots 138 and the bar segments 139 may be similar in construction to the embodiments described previously.

The upper surface 132A of the seat portion 132 can be affixed with a fabric 137. The anchoring harness 136 can include two strap assemblies that are respectively connected with the fabric 137 of the seat portion 132 on the upper surface 132A and adjacently to the rear edge 132C and the armrests 134. The two strap assemblies can have a same construction, each of which including a fastener 1362, and a strap comprised of a first strap portion 1364 and a second strap portion 1366.

The first strap portion 1364 can be made of a resilient material that can elastically deform to stretch and retract. The second strap portion 1366 can be made of a webbing material. The first strap portion 1364 can have a first end connected with one fastener 1362, and a second end connected with the second strap portion 1366. The second strap portion 1366 can be permanently affixed with a rear region of the fabric 137 adjacently to an inner side surface of one armrest 134 via a joint portion 1368. The joint portion 1368 can exemplary be a sewing joint. When the child seat 13 is installed on a vehicle passenger's seat, the first and second strap portions 1364 and 1366 can be stretched rearward of the seat portion 132, and the fasteners 1362 can be attached with the anchorage fixture of the vehicle.

Figure 14A:
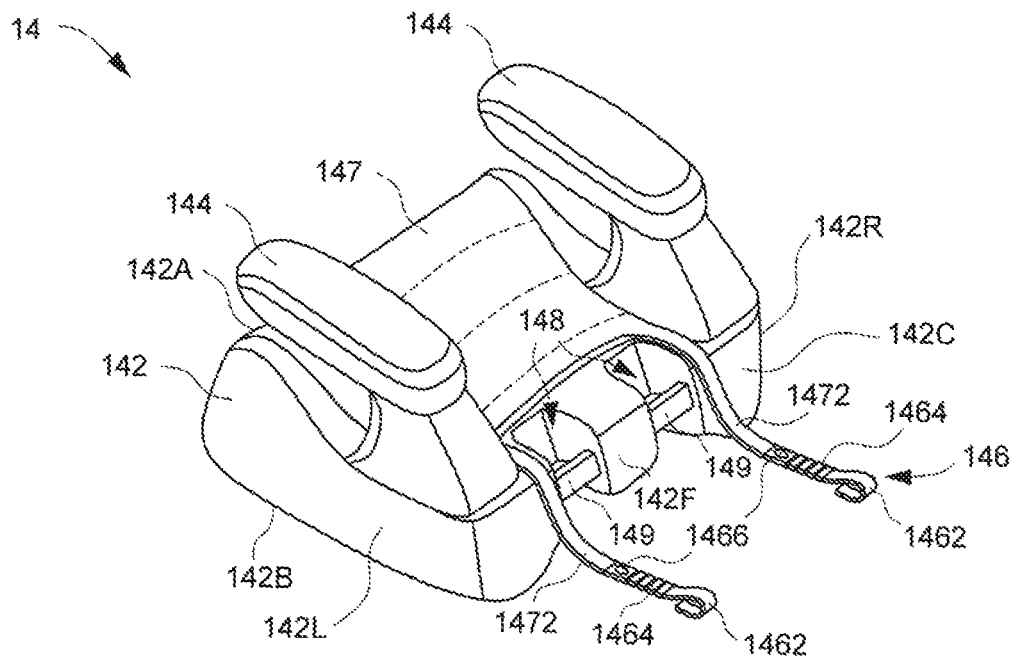
FIGS. 14A and 14B are respectively perspective and side views illustrating another variant embodiment of a child seat provided with an anchoring harness.
Figure 14B:
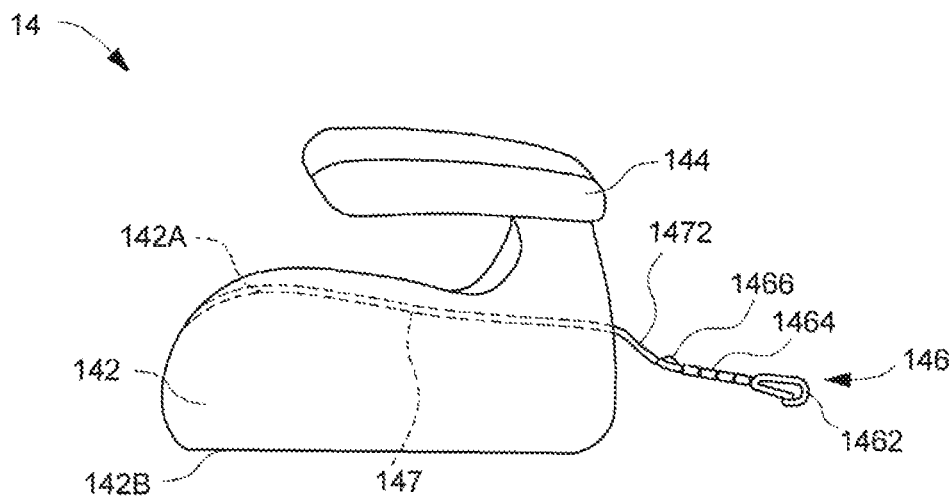

FIGS. 14A and 14B are respectively perspective and side views illustrating another variant embodiment of a child seat 14. The child seat 14 can include a seat portion 142, two armrests 144, and an anchoring harness 146 assembled with the seat portion 142. Like previously described, the seat portion 142 can have an upper and lower surface 142A and 142B, a rear edge 142C, and left and right outer side surfaces 142L and 142R. The seat portion 142 can have two slots 148 and bar segments 149 that are arranged adjacent to the rear edge 142C and are spaced apart from each other by a material portion 142F of the seat portion 142. The seat portion 142, the armrests 144, the slots 148 and the bar segments 149 may be similar in construction to the embodiments described previously.

The upper surface 142A of the seat portion 142 can be affixed with a fabric 147. The anchoring harness 146 can include two strap assemblies that are respectively connected with the fabric 147 of the seat portion 142 on the upper surface 142A and adjacently to the inner side surfaces of the armrests 144. The two strap assemblies can have a same construction, each of which including an elongated extension 1472 extending rearward from a rear of the fabric 147, a fastener 1462, a strap 1464 and a fixing part 1466 (e.g., rivet). The two elongated extensions 1472 can be disposed adjacent to the armrests 144, and extend rearward beyond the rear edge 142C of the seat portion 142. In one embodiment, the extensions 1472 may be formed integrally with the fabric 147.

The straps 1464 can be made of a resilient material that can elastically deform to stretch and retract. Each strap 1464 can have a first end connected with the fastener 1462, and a second end connected with one associated elongated extension 1472 of the fabric 147 via one fixing part 1466. When the child seat 14 is installed on a vehicle passenger's seat, the elongated extensions 1472 and the straps 1464 can be stretched rearward of the seat portion 142, and the fasteners 1462 can be attached with the anchorage fixture of the vehicle. In alternate embodiments, the straps 1464 may be omitted, and the elongated extensions 1472 can be directly connected with the fasteners 1462 via the fixing parts 1466.

Figure 15:
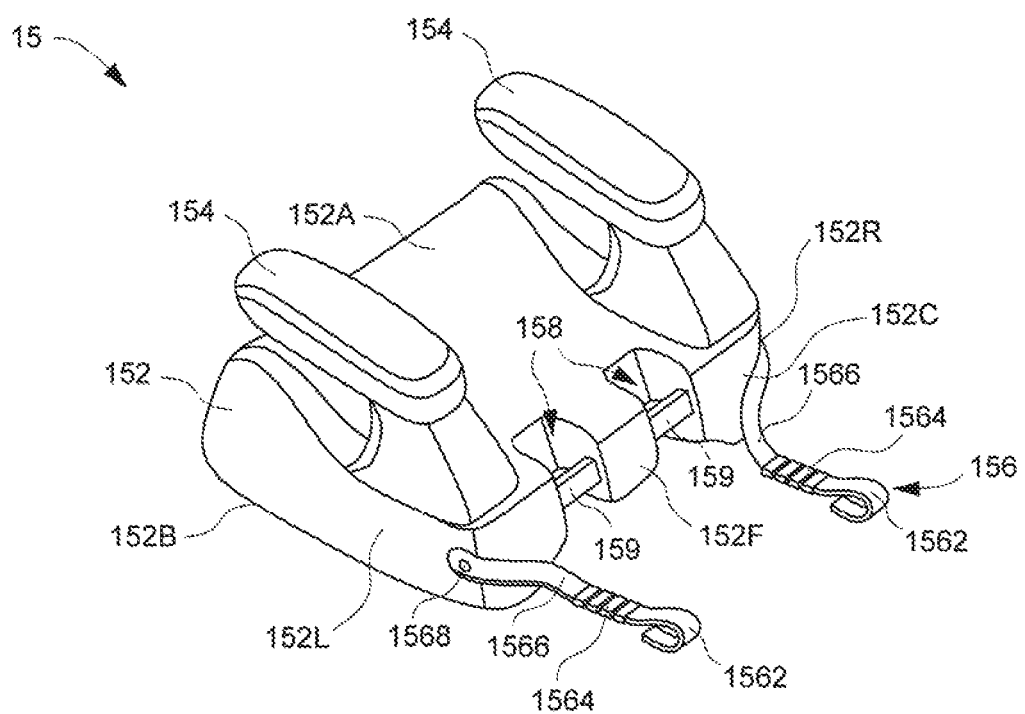
FIG. 15 is a perspective view illustrating another embodiment of a child seat provided with an anchoring harness.

FIG. 15 is a perspective view illustrating another embodiment of a child seat 15. The child seat 15 can include a seat portion 152, two armrests 154, and an anchoring harness 156 assembled with the seat portion 152. Like previously described, the seat portion 152 can have an upper and lower surface 152A and 152B, a rear edge 152C, and left and right outer side surfaces 152L and 152R. The seat portion 152 can have two slots 158 and bar segments 159 that are arranged adjacent to the rear edge 152C and are spaced apart from each other by a material portion 152F of the seat portion 152. The seat portion 152, the armrests 154, the slots 158 and the bar segments 159 may be similar in construction to the embodiments described previously.

The anchoring harness 156 can include two strap assemblies that are respectively connected with the seat portion 152 on the left and right outer side surfaces 152L and 152R and adjacent to the rear edge 152C and the armrests 154. The two strap assemblies can have a same construction, each of which including a fastener 1562, a first strap portion 1564, a second strap portion 1566 and a fixing part 1568 (e.g., a rivet). The first strap portion 1564 can be made of a resilient material that can elastically deform to stretch and retract. The first strap portion 1564 can have a first end connected with one fastener 1562, and a second end connected with the second strap portion 1566.

The second strap portion 1566 can be made of a webbing material having an end attached with one of the left and right outer side surfaces 152L and 152R of the seat portion 152 via one fixing part 1568. The location where the fixing part 1568 attaches the second strap portion 1566 with the seat portion 152 can be below the armrest 154 and adjacent to the rear edge 152C. When the child seat 15 is installed on a vehicle passenger's seat, the strap portions 1564 and 1566 can be stretched rearward of the seat portion 152, and the fasteners 1562 can be attached with the anchorage fixture of the vehicle.

Figure 16A:
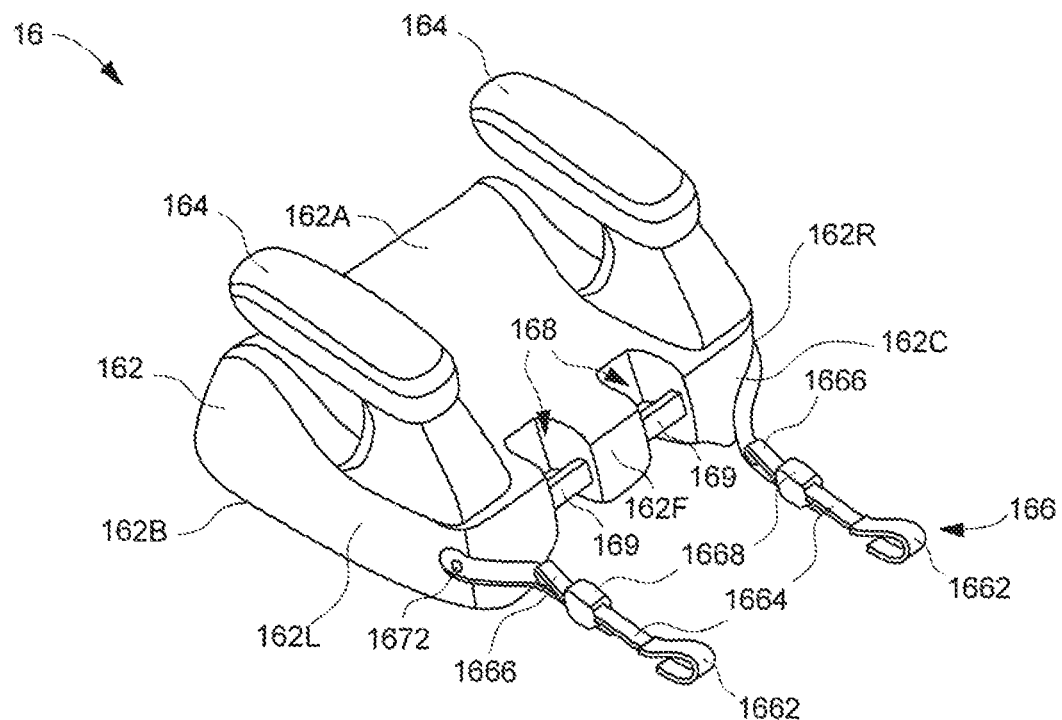
FIGS. 16A and 16B are respectively perspective and side views illustrating another variant embodiment of a child seat provided with an anchoring harness.
Figure 16B:
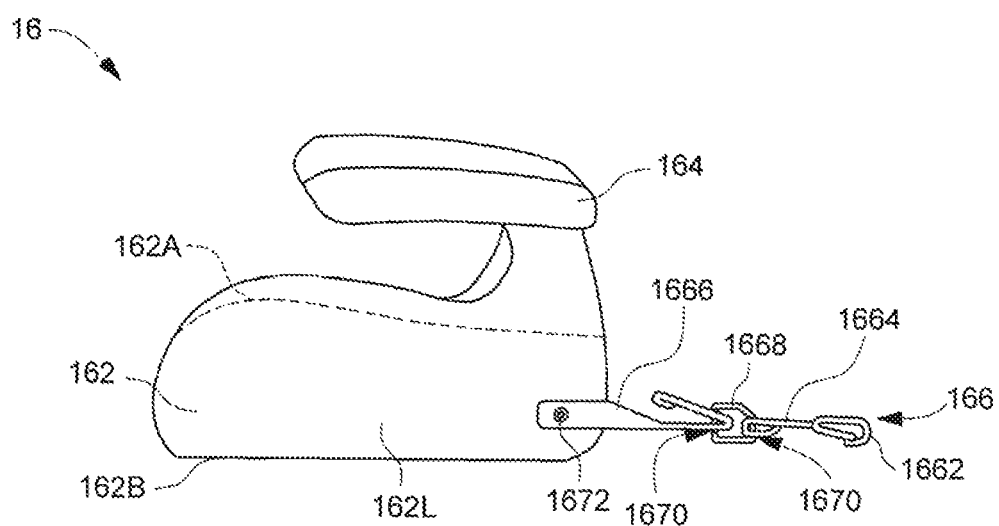

FIGS. 16A and 16B are respectively perspective and side views illustrating another embodiment of a child seat 16. The child seat 16 can include a seat portion 162, two armrests 164, and an anchoring harness 166 assembled with the seat portion 162. Like previously described, the seat portion 162 can have an upper and lower surface 162A and 162B, a rear edge 162C, and left and right outer side surfaces 162L and 162R. The seat portion 162 can have two slots 168 and bar segments 169 that are arranged adjacent to the rear edge 162C and are spaced apart from each other by a material portion 162F of the seat portion 162. The seat portion 162, the armrests 164, the slots 168 and the bar segments 169 may be similar in construction to the embodiments described previously.

The anchoring harness 166 can include two strap assemblies that are respectively connected with the seat portion 162 on the left and right outer side surfaces 162L and 162R adjacently to the rear edge 162C and the armrests 164. The two strap assemblies can have a same construction, each of which including a fastener 1662, a first strap portion 1664, a second strap portion 1666 and an adjustment buckle 1668 connected between the first and second strap portions 1664 and 1666. The first and second strap portions 1664 and 1666 may be made of webbing materials. The adjustment buckle 1668 can have two opposite sides provided with openings 1670. The first strap portion 1664 can have a first end connected with one fastener 1662, and a second end laced through one opening 1670 of the adjustment buckle 1668 to connect the first strap portion 1664 with the adjustment buckle 1668.

The second strap portion 1666 can have a first end laced through the other opening 1670 of the adjustment buckle 1668 to connect the second strap portion 1666 with the adjustment buckle 1668, and a second end attached with one of the left and right outer side surfaces 162L and 162R of the seat portion 162 via one fixing part 1672 (e.g., rivet). The adjustment buckle 1668 can be operable to adjust a length of the first strap portion 1664 relative to the second strap portion 1666.

While the adjustment buckle 1668 has been described with reference to the specific embodiment of FIGS. 16A and 16B, it is understood that the same adjustment buckle 1668 may be implemented in any anchoring harness that has two strap portions.

When the child seat 16 is installed on a vehicle passenger's seat, the strap portions 1664 and 1666 can be stretched rearward of the seat portion 162, and the fasteners 1662 can be attached with the anchorage fixture of the vehicle for holding the child seat 16 in place.

The child seats described herein can include an anchoring harness that can attach with the anchorage fixture of the vehicle to securely hold the child seats in place. The anchoring harness can include a strap provided with a fastener that can attach with the anchorage fixture, and a length adjustment device operable to adjust the length of the strap.

The child seats described herein can be implemented as booster seats with no backrests and internal child restraint harnesses. However, other embodiments of the child seat may also incorporate a backrest and internal child restraint harness to add protection to the child.

Realizations of the child seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child seat comprising:
    a seat portion having a lower surface, an upper surface for providing sitting support, a rear edge defining a rear border of the lower and upper surfaces, and a slot arranged near the rear edge, the seat portion further having a transversal axis extending from a left to a right side of the seat portion; and
    an anchoring harness including a strap, and a fastener connected with the strap and operable to attach with an external anchorage fixture for holding the child seat in place;
    wherein the anchoring harness is connected with the seat portion at a location adjacent to the rear edge, and the strap has an untwisted length that is routed through the slot and extends upwardly and downwardly outside the seat portion near the rear edge, the untwisted length of the strap having a width that extends along the transversal axis.

2. The child seat according to claim 1, being configured as a booster seat.

3. The child seat according to claim 1, wherein the seat portion further includes a bar segment that is disposed adjacent to the rear edge, the strap being routed substantially vertically through the slot and wrapping at least partially around the bar segment.

4. The child seat according to claim 3, wherein the slot has an upper and a lower rim upwardly and downwardly exposed outward, the bar segment being also upwardly and downwardly exposed outward.

5. The child seat according to claim 1, wherein the anchoring harness further includes:
    a mount frame affixed with the seat portion through the slot; and
    a clamping part pivotally connected with the mount frame;
    wherein the strap has one end connected with the fastener and is routed through the mount frame, the clamping part being operable to press against the strap against a raised portion provided on a sidewall of the mount frame.

6. The child seat according to claim 5, wherein the clamping part has a plurality of teeth facing a raised portion protruding from the sidewall of the mount frame, the strap being routed through the mount frame between the clamping part and the raised portion.

7. The child seat according to claim 5, wherein the mount frame is a hollow housing opened at an upper and a lower side, and the strap is routed through an interior of the housing.

8. The child seat according to claim 5, wherein a first portion of the strap extending outward from a first side of the mount frame forms a looped tab, and a second portion of the strap extending outward from a second side of the mount frame is connected with the fastener.

9. The child seat according to claim 8, wherein the looped tab extends outward from an upper side of the mount frame.

10. A child seat comprising:
    a seat portion having a lower surface, an upper surface for providing sitting support, a rear edge defining a rear border of the lower and upper surfaces, a slot and a bar segment disposed adjacent to the rear edge, the bar segment being accessible from an outside of the seat portion and extending along a transversal axis of the seat portion; and
    an anchoring harness assembled with the seat portion, the anchoring harness including a strap, and a fastener connected with the strap and operable to attach with an external anchorage fixture for holding the child seat in place;
    wherein the strap of the anchoring harness has an untwisted length that is routed through the slot, upwardly and downwardly extends outside the seat portion near the rear edge, and wraps at least partially around the bar segment, the untwisted length of the strap having a width that extends parallel to the bar segment.

11. The child seat according to claim 10, wherein the anchoring harness further includes a length adjustment device.

12. The child seat according to claim 10, wherein the strap has a first end connected with the fastener and a second end wrapping at least partially around the bar segment.

13. The child seat according to claim 10, wherein the anchoring harness further includes a mount frame affixed through the slot, and a clamping part pivotally connected with the mount frame and provided with a plurality of teeth facing a raised portion protruding from an inner sidewall of the mount frame, the strap being routed through the mount frame between the clamping part and the raised portion and having one end connected with the fastener.

14. A child seat comprising:
    a seat portion having a lower surface facing downward, an upper surface facing upward for providing sitting support, a rear edge connecting with the lower and upper surfaces and defining a rear border of the lower and upper surfaces, and a slot formed through the seat portion and having an upper and a lower rim located near the rear edge; and an anchoring harness including a mount frame affixed with the seat portion through the slot, a strap, a fastener connected with the strap and operable to attach with an anchorage fixture of a vehicle, and a clamping part connected with the mount frame and operable to clamp the strap to prevent travel of the strap through the slot, the strap having an untwisted length that is routed through the slot and extends outside the seat portion respectively through the upper and lower rims of the slot, the untwisted length of the strap having a width that extends along a transversal axis of the seat portion.

15. The child seat according to claim 14, wherein the clamping part is pivotally connected with the mount frame.

16. The child seat according to claim 14, wherein the clamping part is operable to press the strap against a raised portion provided on a surface of the mount frame.

17. The child seat according to claim 14, wherein the mount frame is a hollow housing opened at an upper and a lower side, and the strap is routed through an interior of the housing.

18. The child seat according to claim 17, wherein the clamping part is assembled through the interior of the housing.

19. The child seat according to claim 14, wherein a first portion of the strap extending outward from a first side of the mount frame forms a looped tab, and a second portion of the strap extending outward from a second side of the mount frame is connected with the fastener.

20. The child seat according to claim 19, wherein the looped tab extends outward from an upper side of the mount frame.

* * * * *